United States Patent
Zhu et al.

(10) Patent No.: US 12,047,902 B2
(45) Date of Patent: *Jul. 23, 2024

(54) METHOD AND APPARATUS FOR OBTAINING EMISSION PROBABILITY, METHOD AND APPARATUS FOR OBTAINING TRANSITION PROBABILITY, AND SEQUENCE POSITIONING METHOD AND APPARATUS

(71) Applicant: Huawei Technologies Co., Ltd., Shenzhen (CN)

(72) Inventors: Fangzhou Zhu, Shenzhen (CN); Mingxuan Yuan, Hong Kong (CN); Jia Zeng, Hong Kong (CN); Weixiong Rao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

This patent is subject to a terminal disclaimer.

(21) Appl. No.: 17/688,087

(22) Filed: Mar. 7, 2022

(65) Prior Publication Data
US 2022/0191818 A1   Jun. 16, 2022

Related U.S. Application Data

(60) Division of application No. 16/791,795, filed on Feb. 14, 2020, now Pat. No. 11,290,975, which is a (Continued)

(30) Foreign Application Priority Data

Aug. 15, 2017 (CN) .......................... 201710698562.1

(51) Int. Cl.
*H04W 64/00* (2009.01)
*G06N 20/00* (2019.01)
(Continued)

(52) U.S. Cl.
CPC .......... *H04W 64/003* (2013.01); *G06N 20/00* (2019.01); *H04W 24/10* (2013.01); *H04W 72/0446* (2013.01); *H04W 76/11* (2018.02)

(58) Field of Classification Search
CPC ... H04W 64/003; H04W 76/11; H04W 24/10; H04W 72/0446; G06N 20/00
See application file for complete search history.

(56) References Cited

U.S. PATENT DOCUMENTS 8,209,121 B1   6/2012 Ogale
9,125,019 B1 * 9/2015 Heikkila ............... G01S 5/0295
(Continued)

FOREIGN PATENT DOCUMENTS

CN  103037507 A   4/2013
CN  103634810 A   3/2014
(Continued)

OTHER PUBLICATIONS

Pirzada, N., et al., "WLAN Location Fingerprinting Technique forDevice-free Indoor Localization System," 2016 3rd International Conference On Computer And Information Sciences (ICCOINS), 2016, 6 pages.
(Continued)

*Primary Examiner* — Khai M Nguyen
(74) *Attorney, Agent, or Firm* — Conley Rose, P.C.

(57) ABSTRACT

A method for obtaining an emission probability includes obtaining a plurality of measurement reports (MRs) of a terminal in a target region and an engineering parameter of at least one base station in the target region, obtaining, based on parameter information in each of the plurality of MRs and the engineering parameter of the at least one base station, a feature vector corresponding to each of the plurality of MRs, processing, using a regression model, location information in each of the plurality of MRs and the feature vector
(Continued)

corresponding to each of the plurality of MRs, to obtain a single-point positioning model, calculating, based on the single-point positioning model, the location information in each of the plurality of MRs, and the feature vector corresponding to each of the plurality of MRs, an emission probability of the feature vector corresponding to each of the plurality of MRs.

20 Claims, 11 Drawing Sheets

Related U.S. Application Data continuation of application No. PCT/CN2017/108647, filed on Oct. 31, 2017.

(51) Int. Cl.
*H04W 24/10* (2009.01)
*H04W 72/0446* (2023.01)
*H04W 76/11* (2018.01)

(56) References Cited

U.S. PATENT DOCUMENTS

| | | | |
|---|---|---|---|
| 9,173,064 | B1 | 10/2015 | Spain, Jr. |
| 11,290,975 | B2 * | 3/2022 | Zhu .................. H04W 4/023 |
| 2002/0071193 | A1 * | 6/2002 | Ogawa .............. G11B 20/1883 |
| 2005/0136944 | A1 | 6/2005 | Misikangas et al. |
| 2006/0240842 | A1 * | 10/2006 | Spain, Jr. ............ G01S 19/42 |
| | | | 701/466 |
| 2013/0079039 | A1 | 3/2013 | Haikkilae et al. |
| 2015/0106443 | A1 | 4/2015 | Jensen et al. |
| 2015/0373501 | A1 * | 12/2015 | Dribinski ............. H04W 4/029 |
| | | | 455/456.1 |
| 2016/0337888 | A1 * | 11/2016 | Zhang ................... G06T 15/06 |

FOREIGN PATENT DOCUMENTS

| | | | |
|---|---|---|---|
| CN | 104202761 | A | 12/2014 |
| CN | 104853432 | A | 8/2015 |
| CN | 105303837 | A * | 2/2016 |
| CN | 106595633 | A | 4/2017 |
| CN | 106662628 | A | 5/2017 |
| CN | 106709606 | A | 5/2017 |
| CN | 107231615 | A | 10/2017 |
| EP | 2624629 | A2 | 8/2013 |
| EP | 3059992 | A1 | 8/2016 |

OTHER PUBLICATIONS

Wang, H., et al., "Signal fingerprint wireless location method assisted with luetooth network formation for GSM," Journal of Computer Applications, vol. 29 No. 11, Nov. 2009, 3 pages.

Hu, K., et al., "Techniques of Wireless Positioning in Mobile Communication Systems," Journal of Changchun Post and Telecommunication Institute, vol. 23, No. 4, Jul. 2005, 7 pages.

Zhu, F., et al. "City-Scale Localization with Telco Big Data," CIKM '16, Oct. 24-28, 2016, pp. 439-448.

Huang, Y., et al,. "Experimental Study of Telco Localization Methods," IEEE 18th International Conference on Mobile Data Management, 2017, pp. 299-306.

Ray, A., et al., "Localization of LTE measurement records with missing information," IEEE Infocom, The 35th Annual IEEE International Conference on Computer Communications, 2016, 9 pages.

\* cited by examiner

1. Experimental region: Xuhui District in Shanghai with 2.5 km * 2.9 km
2. Data used in the experiment is obtained through drive test
3. The training set includes 33,049 tracks, and the test set includes 16,720 tracks

METHOD AND APPARATUS FOR OBTAINING EMISSION PROBABILITY, METHOD AND APPARATUS FOR OBTAINING TRANSITION PROBABILITY, AND SEQUENCE POSITIONING METHOD AND APPARATUS

CROSS-REFERENCE TO RELATED APPLICATIONS

This is a divisional of U.S. patent application Ser. No. 16/791,795, filed on Feb. 14, 2020, which is a continuation of International Patent Application No. PCT/CN2017/108647, filed on Oct. 31, 2017, which claims priority to Chinese Patent Application No. 201710698562.1, filed on Aug. 15, 2017. All of the aforementioned patent applications are hereby incorporated by reference in their entireties.

TECHNICAL FIELD

The present disclosure relates to the field of telecommunication positioning, and in particular, to a method and an apparatus for obtaining an emission probability used for sequence positioning.

BACKGROUND

Telecommunication positioning means obtaining a location of a mobile device through calculation using data sent by the mobile device to a pipeline side (such as a telecommunications operator) and data on a base station side. Currently, common telecommunication positioning technologies include a range-based method, a fingerprint method, and a sequence positioning method. A main idea of the sequence positioning method (or a sequence method) is to describe a positioning process as a model of matching from an observed sequence to a hidden sequence, where a latitude and longitude location is used as a hidden state, and signal strength is used as an observed value. During positioning, an observed value sequence is used as input, and an optimal hidden state sequence in a one-to-one correspondence with the input observed value sequence is output as a positioning result. A core of the positioning method is to define an emission probability and a transition probability. The emission probability means mapping from a hidden state to an observed value. The transition probability means transition between different hidden states.

The sequence positioning method has the following main advantage. Context information of a location is used such that a prediction result of each location can be restricted by a previous location, and a relatively smooth track is obtained, thereby effectively avoiding a case in which a prediction result obtained using a method such as the range-based method and the fingerprint method "jumps". Obtaining of the emission probability and the transition probability directly affects a positioning capability of the sequence positioning method. In other approaches, the emission probability is obtained by modeling a mean square error of signal strength. The emission probability obtained using the method cannot describe complex observed information. This directly affects positioning precision and reliability of the sequence positioning method.

SUMMARY

To resolve a technical problem in other approaches, this application provides a method for obtaining an emission probability such that an obtained emission probability can express complex observed information, and using the emission probability for sequence positioning can improve positioning precision and reliability of a sequence positioning method.

According to a first aspect, this application provides a method for obtaining an emission probability. The method includes obtaining a plurality of measurement reports (MRs) of a terminal in a target region and an engineering parameter of at least one base station in the target region, where the target region is a predetermined geographical region. For example, the target region may be obtained through division based on a population quantity and an administrative region. For example, a suburb of a city is a target region or an urban region of a city is a target region. An area size, a geographical location, and the like of the target region are not limited in this application. Generally, an emission probability obtained based on an MR of a terminal in a region is applied to the region. It should be noted that, the obtaining a plurality of MRs of a terminal in a target region may be obtaining a plurality of MRs of one terminal in the target region, or may be obtaining a plurality of MRs of a plurality of terminals in the target region. In addition, a quantity of MRs of one terminal is not limited, and the plurality of terminals may have one or more MRs. Each of the plurality of MRs includes location information and parameter information. The location information is used to indicate a location that is in the target region and that is of a terminal corresponding to the MR including the location information. Parameter information in an MR is not limited in this application. Generally, information other than location information in the MR may be parameter information.

Optionally, the parameter information includes an environment parameter. The environment parameter is used to indicate an environment in which a terminal corresponding to an MR including the environment parameter is located, for example, time period information, weather information, and event information (a holiday, a celebration day, a sports meeting, or the like). Different emission probabilities are obtained based on different environments, and the environment parameter is used as a feature such that positioning in different environments can be more accurately supported.

The method further includes: obtaining, based on the parameter information in each of the plurality of MRs and the engineering parameter of the at least one base station, a feature vector corresponding to each of the plurality of MRs, where the parameter information includes a plurality of pieces of information, and where a feature vector obtained using the parameter information and an engineering parameter of a corresponding base station can express complex observed information; processing, using a machine learning model, the location information in each of the plurality of MRs and the feature vector corresponding to each of the plurality of MRs, to obtain a single-point positioning model; and calculating, based on the single-point positioning model, the location information in each of the plurality of MRs, and the feature vector corresponding to each of the plurality of MRs, an emission probability of the feature vector corresponding to each of the plurality of MRs, where the emission probability includes at least one emission probability value, and where the emission probability value is used to indicate a probability that a feature vector corresponds to a piece of location information. It should be noted that, an MR that is input into the single-point positioning model and an MR that is used to train the single-point positioning model may not be limited to MRs of a same terminal, and may alternatively be MRs of a terminal other than the terminal in the target region, that is, the MR that is used to obtain the single-point positioning model and the MR that is used to be input into the single-point positioning model to calculate the emission probability may be MRs uploaded by different terminals in the target region. The single-point positioning model is obtained through training using MRs of a terminal in the target region, then MRs of the terminal in the target region is input into the single-point positioning model, and a correspondence between a feature vector and location information is obtained through statistics collection using a spatial model of the single-point positioning model such that the correspondence is more reliable.

In a possible implementation of the first aspect, the parameter information in each of the plurality of MRs includes at least one base station identifier (ID), and the base station ID is used to indicate a base station to which a terminal corresponding to an MR including the base station ID is connected. Actually, one MR may include information about a plurality of base stations to which a corresponding terminal is connected. The at least one base station includes at least base stations indicated by base station IDs included in the plurality of MRs such that the base station ID in each MR corresponds to an engineering parameter used to obtain a feature vector. The obtaining, based on the parameter information in each of the plurality of MRs and the engineering parameter of the at least one base station, a feature vector corresponding to each of the plurality of MRs includes matching the plurality of MRs with the engineering parameter of the at least one base station based on the base station IDs, to obtain an associated engineering parameter of each of the plurality of MRs, where an associated engineering parameter of any MR includes an engineering parameter of a base station indicated by each base station ID in the any MR, and obtaining, based on the associated engineering parameter and the parameter information of each of the plurality of MRs, the feature vector corresponding to each of the plurality of MRs, where any feature vector includes an associated engineering parameter and parameter information of one MR. It should be noted that a quantity of base stations indicated by a base station ID in a corresponding MR generally determines that engineering parameters of how many base stations can be included in a feature vector. Optionally, the feature vector may include only one engineering parameter of at least one base station indicated by at least one base station ID included in the corresponding MR.

In a possible implementation of the first aspect, the processing, using a machine learning model, the location information in each of the plurality of MRs and the feature vector corresponding to each of the plurality of MRs, to obtain a single-point positioning model includes obtaining, based on the location information in each of the plurality of MRs and the feature vector corresponding to each of the plurality of MRs, a training set corresponding to each of the plurality of MRs, where any training set includes a feature vector and location information that correspond to one MR, and inputting, into the machine learning model for training, the training set corresponding to each of the plurality of MRs, to obtain the single-point positioning model.

In a possible implementation of the first aspect, the calculating, based on the single-point positioning model, the location information in each of the plurality of MRs, and the feature vector corresponding to each of the plurality of MRs, an emission probability of the feature vector corresponding to each of the plurality of MRs includes inputting, into the single-point positioning model, the location information in each of the plurality of MRs and the feature vector corresponding to each of the plurality of MRs, to obtain a mapping relationship, where the mapping relationship is used to indicate a correspondence between a feature vector and location information, and calculating, based on the mapping relationship, the emission probability of the feature vector corresponding to each of the plurality of MRs. Optionally, feature vectors corresponding to MRs that are input into the single-point positioning model and location information in the MRs may not be the feature vectors corresponding to the MRs of the terminal and the location information in the MRs, and may be MRs of a plurality of other terminals in a same target region as the terminal. In addition, a method for obtaining the feature vectors is the same as a method for obtaining the feature vectors corresponding to the MRs of the terminal. Details are not described herein again.

In a possible implementation of the first aspect, the machine learning model is a regression model, for example, logistic regression or a random forest, and a specific model of the regression model is not limited herein.

According to the method for obtaining an emission probability provided in this application, feature vectors obtained using a plurality of pieces of parameter information in MRs and engineering parameters of corresponding base stations are used as observed values, and then a single-point positioning model is trained using the feature vectors and location information that correspond to the MRs such that an emission probability obtained using a spatial model of the single-point positioning model can express complex observed information, and a correspondence between a feature vector (an observed value) and location information is more reliable.

According to a second aspect, the present disclosures provides a method for obtaining a transition probability. The method includes obtaining a plurality of pieces of track data of a terminal in a target region, where the target region is a predetermined geographical region. For example, the target region may be obtained through division based on a population quantity and an administrative region. For example, a suburb of a city is a target region or an urban region of a city is a target region. An area size, a geographical location, and the like of the target region are not limited in this application. Generally, an emission probability obtained based on an MR of a terminal in a region is applied to the region. Each of the plurality of pieces of track data includes at least two pieces of location information. The location information is used to indicate a location that is in the target region and that is of a terminal corresponding to track data including the location information. Each of a plurality of pieces of location information included in the plurality of pieces of track data corresponds to a time stamp. The method further includes calculating a transition probability based on the plurality of pieces of track data, where the transition probability includes at least one transition probability value, and the transition probability value is used to indicate a probability that movement is performed from a piece of location information to another piece of location information after a time interval T. Optionally, the plurality of pieces of track data of the terminal in the target region are from a third-party platform, for example, a third-party app such as Didi Chuxing or a bicycle-sharing platform.

Optionally, the plurality of pieces of track data include a same environment parameter. The environment parameter is used to indicate an environment in which a terminal corresponding to track data including the environment parameter is located, for example, at least one of time period information, weather information, and event information. Different transition probabilities are obtained based on different environments, and the environment parameter is used as an identifier such that positioning in different environments can be more accurately supported.

In a possible implementation of the second aspect, the calculating a transition probability based on the plurality of pieces of track data includes processing the plurality of pieces of track data to obtain at least one combination sequence of each of the plurality of pieces of track data, where the combination sequence includes any two pieces of location information in one piece of track data and a time interval between the any two pieces of location information, and a time interval between two pieces of location information may be obtained through calculation based on time stamps respectively corresponding to the two pieces of location information, and obtaining, based on a first preset condition and the at least one combination sequence of each of the plurality of pieces of track data, a transition probability corresponding to the first preset condition, where the first preset condition is any one of a plurality of preset conditions, each of the plurality of preset conditions includes a preset time interval and preset location information, the preset time interval corresponds to the time interval T, and the preset location information corresponds to the piece of location information.

In a possible implementation of the second aspect, the obtaining, based on a first preset condition and the at least one combination sequence of each of the plurality of pieces of track data, a transition probability corresponding to the first preset condition includes determining combination sequences that include a preset time interval and preset location information in the first preset condition and that are in all combination sequences included in the plurality of pieces of track data, and collecting statistics about the combination sequences that include the preset time interval and the preset location information in the preset condition, and calculating the transition probability corresponding to the first preset condition. For example, it is determined that a quantity of all combination sequences that include location information A and a time interval T1 is M, and the combination sequences may be represented as [location information A, time interval T1, and location information $X_n$]. A quantity of pieces of each of location information $X_1$ to $X_n$ is counted in all the combination sequences that include the location information A and the time interval T1, to obtain a probability value that each of the location information $X_1$ to $X_n$ occupies in M. The probability values that correspond to the location information $X_1$ to $X_n$ constitute a transition probability corresponding to the condition including the location information A and the time interval T1. Optionally, the preset time interval is a preset time interval range, and the preset time interval may be specific duration or a duration range. For example, the preset time interval is 2 seconds, or the preset time interval is 2 seconds to 4 seconds. In this way, a transition probability corresponding to a duration range can be obtained. Because different terminals may obtain MRs at different frequencies, time intervals in combination sequences obtained using track data of different terminals may be different. The time interval in the preset condition is set to a value range such that combination sequences corresponding to different time intervals may be fused to use existing data to a maximum extent.

In a possible implementation of the second aspect, before the calculating a transition probability based on the plurality of pieces of track data, the method further includes removing defective track data from the plurality of pieces of track data, where the defective track data is track data in which at least one piece of location information deviates from a road in the target region by a distance greater than a first threshold, or is track data in which a distance between two pieces of adjacent location information is greater than a second threshold. In practice, unreliable data, namely, defective track data, may exist in track data obtained from a third party. The defective track data is removed from the obtained plurality of pieces of track data, and then further processing continues to be performed on track data obtained after the removal, to obtain the transition probability such that a movement track of the terminal recovered/predicted using the transition probability can be more reliable and smooth.

In a possible implementation of the second aspect, before the calculating a transition probability based on the plurality of pieces of track data, the method further includes determining sparse track data in the plurality of pieces of track data, where the sparse track data is track data in which a distance between any two pieces of adjacent location information in the at least two pieces of location information included in the track data is greater than a third threshold, and inserting one or more pieces of location information between the any two pieces of adjacent location information in the sparse track data based on map information of the target region. Interpolation processing is performed such that location information in obtained track data can be denser. A transition probability obtained based on the track data obtained after the interpolation processing is used to recover/predict the movement track of the terminal such that the recovered/predicted movement track can be smoother. In addition, transition probabilities corresponding to more different time intervals can be obtained. In a possible implementation of the second aspect, the obtaining a plurality of pieces of track data of a terminal in a target region includes obtaining the plurality of pieces of track data of the terminal in the target region in a peak traffic time period or a non-peak traffic time period. In practice, a movement track of the terminal in the peak traffic time period is usually different from a movement track of the terminal in the non-peak traffic time period. Different transition probabilities obtained in the peak traffic time period and the non-peak traffic period are used to recover/predict a movement track of the terminal in a corresponding time period such that accuracy and reliability of recovering/predicting the movement track of the terminal can be improved.

According to the method for obtaining a transition probability provided in this application, a transition probability calculated based on movement track data that is of a terminal in a target region and that is provided by a third-party platform is used to recover or predict a movement track of a terminal in the target region such that the movement track is smoother, and track jumping can effectively be avoided.

According to a third aspect, this application provides a sequence positioning method. The method includes obtaining a plurality of target MRs of a target terminal in a target region and an engineering parameter of at least one base station in the target region, where the target region is a predetermined geographical region, and each of the plurality of target MRs includes parameter information, obtaining, based on the parameter information in each of the plurality of target MRs and the engineering parameter of the at least one base station, a target feature vector corresponding to each of the plurality of target MRs, and inputting, into a sequence positioning model, the target feature vector corresponding to each of the plurality of target MRs, to obtain a movement track of the target terminal. Application parameters of the sequence positioning model include an emission probability and a transition probability. The emission probability may be obtained using the method according to any one of the first aspect or the possible implementations of the first aspect, and/or the transition probability may be obtained using the method according to any one of the second aspect or the possible implementations of the second aspect. Details are not described herein again.

According to the sequence positioning method provided in this application, an emission probability obtained based on feature vectors obtained based on a plurality of pieces of parameter information in MRs and engineering parameters of corresponding base stations can express more complex observed information, thereby further improving accuracy and reliability of a movement track recovered/predicted through sequence positioning.

According to a fourth aspect, this application provides a sequence positioning method. The method includes obtaining a plurality of target MRs of a target terminal in a target region and an engineering parameter of at least one base station in the target region, where the target region is a predetermined geographical region, and each of the plurality of target MRs includes parameter information, obtaining, based on the parameter information in each of the plurality of target MRs and the engineering parameter of the at least one base station, a target feature vector corresponding to each of the plurality of target MRs, and inputting, into a sequence positioning model, the target feature vector corresponding to each of the plurality of target MRs, to obtain a movement track of the target terminal.

Application parameters of the sequence positioning model include an emission probability and a transition probability. The transition probability is obtained using the following method obtaining a plurality of pieces of track data of a terminal in the target region, where each of the plurality of pieces of track data of the terminal includes at least two pieces of second location information, the second location information is used to indicate a location that is in the target region and that is of a terminal corresponding to track data including the second location information, and each of a plurality of second location information included in the plurality of pieces of track data of the terminal corresponds to a time stamp, and calculating a transition probability based on the plurality of pieces of track data of the terminal, where the transition probability includes at least one transition probability value, and the transition probability value is used to indicate a probability that movement is performed from a piece of second location information to another piece of second location information after a time interval T.

In a possible implementation of the fourth aspect, the calculating a transition probability based on the plurality of pieces of track data of the terminal includes processing the plurality of pieces of track data of the terminal to obtain at least one combination sequence of each of the plurality of pieces of track data of the terminal, where the combination sequence includes any two pieces of second location information in one piece of track data of the terminal and a time interval between the any two pieces of second location information, and obtaining, based on a first preset condition and the at least one combination sequence of each of the plurality of pieces of track data of the terminal, a transition probability corresponding to the first preset condition, where the first preset condition is any one of a plurality of preset conditions, each of the plurality of preset conditions includes a preset time interval and preset second location information, the preset time interval corresponds to the time interval T, and the preset second location information corresponds to the piece of second location information.

In a possible implementation of the fourth aspect, the obtaining, based on a first preset condition and the at least one combination sequence of each of the plurality of pieces of track data of the terminal, a transition probability corresponding to the first preset condition includes determining combination sequences that include a preset time interval and preset second location information in the first preset condition and that are in all combination sequences included in the plurality of pieces of track data of the terminal, and collecting statistics about the combination sequences that include the preset time interval and the preset second location information in the preset condition, and calculating the transition probability corresponding to the first preset condition.

In a possible implementation of the fourth aspect, before the calculating a transition probability based on the plurality of pieces of track data of the terminal, the method further includes removing defective track data from the plurality of pieces of track data of the terminal, where the defective track data is track data in which at least one piece of second location information deviates from a road in the target region by a distance greater than a first threshold, or is track data in which a distance between two pieces of adjacent second location information is greater than a second threshold.

In a possible implementation of the fourth aspect, before the calculating a transition probability based on the plurality of pieces of track data of the terminal, the method further includes determining sparse track data in the plurality of pieces of track data of the terminal, where the sparse track data is track data in which a distance between any two pieces of adjacent second location information in the at least two pieces of second location information included in the track data is greater than a third threshold, and inserting one or more pieces of second location information between the any two pieces of adjacent second location information in the sparse track data based on map information of the target region.

In a possible implementation of the fourth aspect, the obtaining a plurality of pieces of track data of a terminal in the target region includes obtaining the plurality of pieces of track data of the terminal in the target region in a peak traffic time period or a non-peak traffic time period.

In a possible implementation of the fourth aspect, the preset time interval is a preset time interval range.

In a possible implementation of the fourth aspect, the emission probability is obtained using the method according to any one of the first aspect or the possible implementations of the first aspect.

According to the sequence positioning method provided in this application, a transition probability obtained using real track data from a third party is used for sequence positioning such that smoothness of a recovered/predicted movement track can be improved, and the obtained movement track is more reliable.

According to a fifth aspect, this application provides an apparatus for calculating an emission probability, where the apparatus for calculating an emission probability includes a MR obtaining module, a feature vector module, a regression processing module, and an emission probability calculation module. The MR obtaining module is configured to obtain a plurality of MRs of a terminal in a target region and an engineering parameter of at least one base station in the target region, where the target region is a predetermined geographical region, each of the plurality of MRs includes location information and parameter information, and the location information is used to indicate a location that is in the target region and that is of a terminal corresponding to the MR including the location information. The feature vector module is configured to obtain, based on the parameter information in each of the plurality of MRs and the engineering parameter of the at least one base station that are obtained by the MR obtaining module, a feature vector corresponding to each of the plurality of MRs. The regression processing module is configured to obtain a single-point positioning model based on the location information in each of the plurality of MRs obtained by the MR obtaining module and the feature vector that corresponds to each of the plurality of MRs and that is obtained by the feature vector module. The emission probability calculation module is configured to calculate, based on the single-point positioning model obtained by the regression processing module, the location information in each of the plurality of MRs obtained by the MR obtaining module, and the feature vector that corresponds to each of the plurality of MRs and that is obtained by the feature vector module, an emission probability of the feature vector corresponding to each of the plurality of MRs, where the emission probability includes at least one emission probability value, and the emission probability value is used to indicate a probability that a feature vector corresponds to a piece of location information.

In a possible implementation of the fifth aspect, the parameter information in each of the plurality of MRs includes at least one base station ID, the base station ID is used to indicate a base station to which a terminal corresponding to an MR including the base station ID is connected, and the at least one base station includes at least base stations indicated by base station IDs included in the plurality of MRs, and the feature vector module is further configured to match, based on the base station IDs, the plurality of MRs obtained by the MR obtaining module with the engineering parameter of the at least one base station obtained by the MR obtaining module, to obtain an associated engineering parameter of each of the plurality of MRs, where an associated engineering parameter of any MR includes an engineering parameter of a base station indicated by each base station ID in the any MR, and obtain, based on the associated engineering parameter and the parameter information of each of the plurality of MRs obtained by the MR obtaining module, the feature vector corresponding to each of the plurality of MRs, where any feature vector includes an associated engineering parameter and parameter information of one MR.

In a possible implementation of the fifth aspect, the regression processing module is further configured to obtain, based on the location information in each of the plurality of MRs obtained by the MR obtaining module and the feature vector that corresponds to each of the plurality of MRs and that is obtained by the feature vector module, a training set corresponding to each of the plurality of MRs, where any training set includes a feature vector and location information that correspond to one MR, and input, into the machine learning model for training, the training set corresponding to each of the plurality of MRs, to obtain the single-point positioning model.

In a possible implementation of the fifth aspect, the emission probability calculation module is further configured to input, into the single-point positioning model obtained by the regression processing module, the location information in each of the plurality of MRs obtained by the MR obtaining module and the feature vector that corresponds to each of the plurality of MRs and that is obtained by the feature vector module, to obtain a mapping relationship, where the mapping relationship is used to indicate a correspondence between a feature vector and location information, and calculate, based on the mapping relationship, the emission probability of the feature vector corresponding to each of the plurality of MRs.

According to the apparatus for calculating an emission probability provided in this application, feature vectors obtained using a plurality of pieces of parameter information in MRs and engineering parameters of corresponding base stations are used as observed values, and then a single-point positioning model is trained using the feature vectors and location information that correspond to the MRs such that an emission probability obtained using a spatial model of the single-point positioning model can express complex observed information, and a correspondence between a feature vector (an observed value) and location information is more reliable.

According to a sixth aspect, this application provides an apparatus for calculating a transition probability, where the apparatus for calculating a transition probability includes a track obtaining module and a transition probability calculation module. The track obtaining module is configured to obtain a plurality of pieces of track data of a terminal in a target region, where the target region is a predetermined geographical region, each of the plurality of pieces of track data includes at least two pieces of location information, the location information is used to indicate a location that is in the target region and that is of a terminal corresponding to track data including the location information, and each of a plurality of pieces of location information included in the plurality of pieces of track data corresponds to a time stamp. The transition probability calculation module is configured to calculate a transition probability based on the plurality of pieces of track data obtained by the track obtaining module, where the transition probability includes at least one transition probability value, and the transition probability value is used to indicate a probability that movement is performed from a piece of location information to another piece of location information after a time interval T. Optionally, a plurality of pieces of track data of the terminal in the target region in a peak traffic time period or a non-peak traffic time period are obtained.

In a possible implementation of the sixth aspect, the transition probability calculation module includes a preprocessing unit and a transition probability calculation unit. The preprocessing unit is configured to process the plurality of pieces of track data obtained by the track obtaining module, to obtain at least one combination sequence of each of the plurality of pieces of track data, where the combination sequence includes any two pieces of location information in one piece of track data and a time interval between the any two pieces of location information. The transition probability calculation unit is configured to obtain, based on a first preset condition and the at least one combination sequence that is of each of the plurality of pieces of track data and that is obtained by the preprocessing unit, a transition probability corresponding to the first preset condition, where the first preset condition is any one of a plurality of preset conditions, each of the plurality of preset conditions includes a preset time interval and preset location information, the preset time interval corresponds to the time interval T, and the preset location information corresponds to the piece of location information. Optionally, the preset time interval is a preset time interval range.

In a possible implementation of the sixth aspect, the transition probability calculation unit is further configured to determine combination sequences that include a preset time interval and preset location information in the first preset condition and that are in all combination sequences that are included in the plurality of pieces of track data and that are obtained by the preprocessing unit, and collect statistics about the combination sequences that include the preset time interval and the preset location information in the preset condition, and calculate the transition probability corresponding to the first preset condition.

In a possible implementation of the sixth aspect, the apparatus further includes a first track processing module. The first track processing module is configured to remove defective track data from the plurality of pieces of track data obtained by the track obtaining module, where the defective track data is track data in which at least one piece of location information deviates from a road in the target region by a distance greater than a first threshold, or is track data in which a distance between two pieces of adjacent location information is greater than a second threshold.

In a possible implementation of the sixth aspect, the apparatus further includes a second track processing module. The second track processing module is configured to determine sparse track data in the plurality of pieces of track data obtained by the track obtaining module, where the sparse track data is track data in which a distance between any two pieces of adjacent location information in the at least two pieces of location information included in the track data is greater than a third threshold, and insert one or more pieces of location information between the any two pieces of adjacent location information in the sparse track data based on map information of the target region.

According to the apparatus for calculating a transition probability provided in this application, a transition probability calculated based on movement track data that is of a terminal in a target region and that is provided by a third-party platform is used to recover or predict a movement track of a terminal in the target region such that the movement track is smoother, and track jumping can effectively be avoided.

According to a seventh aspect, this application provides a sequence positioning apparatus, where the sequence positioning apparatus includes an emission probability calculation module, a transition probability calculation module, and a sequence positioning module.

The sequence positioning module includes a target MR obtaining unit, a target feature vector unit, and a track prediction unit. The target MR unit is configured to obtain a plurality of target MRs of a target terminal in a target region and an engineering parameter of at least one base station in the target region, where the target region is a predetermined geographical region, and each of the plurality of target MRs includes parameter information. The target feature vector unit is configured to obtain, based on the parameter information in each of the plurality of target MRs and the engineering parameter of the at least one base station that are obtained by the target MR unit, a target feature vector corresponding to each of the plurality of target MRs. The track prediction unit is configured to obtain a movement track of the target terminal based on the target feature vector that corresponds to each of the plurality of target MRs and that is obtained by the target feature vector unit. Application parameters of the sequence positioning model include an emission probability and a transition probability.

The emission probability calculation module is configured to calculate the emission probability, and the transition probability calculation module is configured to calculate the transition probability.

The emission probability calculation module includes a MR obtaining unit, a feature vector unit, a regression processing unit, and an emission probability calculation unit. The MR obtaining unit is configured to obtain a plurality of MRs of a first terminal in the target region and the engineering parameter of the at least one base station in the target region, where each of the plurality of MRs includes location information and parameter information, and the location information is used to indicate a location that is in the target region and that is of a first terminal corresponding to the MR including the location information. The feature vector unit is configured to obtain, based on the parameter information in each of the plurality of MRs and the engineering parameter of the at least one base station that are obtained by the MR obtaining unit, a feature vector corresponding to each of the plurality of MRs. The regression processing unit is configured to obtain a single-point positioning model based on the location information in each of the plurality of MRs obtained by the MR obtaining unit and the feature vector that corresponds to each of the plurality of MRs and that is obtained by the feature vector unit. The emission probability calculation unit is configured to calculate, based on the single-point positioning model obtained by the regression processing unit, the location information in each of the plurality of MRs obtained by the MR obtaining unit, and the feature vector that corresponds to each of the plurality of MRs and that is obtained by the feature vector unit, an emission probability of the feature vector corresponding to each of the plurality of MRs, where the emission probability includes at least one emission probability value, and the emission probability value is used to indicate a probability that a feature vector corresponds to a piece of location information.

Alternatively, the transition probability calculation module includes a track obtaining unit and a transition probability calculation unit. The track obtaining unit is configured to obtain a plurality of pieces of track data of a second terminal in the target region, where each of the plurality of pieces of track data includes at least two pieces of location information, the location information is used to indicate a location that is in the target region and that is of a second terminal corresponding to track data including the location information, and each of a plurality of pieces of location information included in the plurality of pieces of track data corresponds to a time stamp. The transition probability calculation unit is configured to calculate a transition probability based on the plurality of pieces of track data obtained by the track obtaining unit, where the transition probability includes at least one transition probability value, and the transition probability value is used to indicate a probability that movement is performed from a piece of location information to another piece of location information after a time interval T.

In a possible implementation of the seventh aspect, the parameter information in each of the plurality of MRs includes at least one base station ID, the base station ID is used to indicate a base station to which a first terminal corresponding to an MR including the base station ID is connected, and the at least one base station includes at least base stations indicated by base station IDs included in the plurality of MRs. The feature vector unit is further configured to match, based on the base station IDs, the plurality of MRs obtained by the MR obtaining unit with the engineering parameter of the at least one base station obtained by the MR obtaining unit, to obtain an associated engineering parameter of each of the plurality of MRs, where an associated engineering parameter of any MR includes an engineering parameter of a base station indicated by each base station ID in the any MR, and obtain, based on the associated engineering parameter and the parameter information of each of the plurality of MRs obtained by the MR obtaining unit, the feature vector corresponding to each of the plurality of MRs, where any feature vector includes an associated engineering parameter and parameter information of one MR.

In a possible implementation of the seventh aspect, the regression processing unit is further configured to obtain, based on the location information in each of the plurality of MRs obtained by the MR obtaining unit and the feature vector that corresponds to each of the plurality of MRs and that is obtained by the feature vector unit, a training set corresponding to each of the plurality of MRs, where any training set includes a feature vector and location information that correspond to one MR, and input, into the machine learning model for training, the training set corresponding to each of the plurality of MRs, to obtain the single-point positioning model.

In a possible implementation of the seventh aspect, the emission probability calculation unit is further configured to input, into the single-point positioning model obtained by the regression processing unit, the location information in each of the plurality of MRs obtained by the MR obtaining unit and the feature vector that corresponds to each of the plurality of MRs and that is obtained by the feature vector unit, to obtain a mapping relationship, where the mapping relationship is used to indicate a correspondence between a feature vector and location information, and calculate, based on the mapping relationship, the emission probability of the feature vector corresponding to each of the plurality of MRs.

In a possible implementation of the seventh aspect, the transition probability calculation unit includes a preprocessing subunit and a transition probability calculation subunit. The preprocessing subunit is configured to process the plurality of pieces of track data obtained by the track obtaining unit, to obtain at least one combination sequence of each of the plurality of pieces of track data, where the combination sequence includes any two pieces of location information in one piece of track data and a time interval between the any two pieces of location information. The transition probability calculation subunit is configured to obtain, based on a first preset condition and the at least one combination sequence that is of each of the plurality of pieces of track data and that is obtained by the preprocessing subunit, a transition probability corresponding to the first preset condition, where the first preset condition is any one of a plurality of preset conditions, each of the plurality of preset conditions includes a preset time interval and preset location information, the preset time interval corresponds to the time interval T, and the preset location information corresponds to the piece of location information.

In a possible implementation of the seventh aspect, the transition probability calculation subunit is further configured to determine combination sequences that include a preset time interval and preset location information in the first preset condition and that are in all combination sequences that are included in the plurality of pieces of track data and that are obtained by the preprocessing subunit, and collect statistics about the combination sequences that include the preset time interval and the preset location information in the preset condition, and calculate the transition probability corresponding to the first preset condition.

According to an eighth aspect, This application provides a sequence positioning system, where the system includes a positioning apparatus, the apparatus for calculating an emission probability according to any one of the fifth aspect or the possible implementations of the fifth aspect, and the apparatus for calculating a transition probability according to any one of the sixth aspect or the possible implementations of the sixth aspect. The positioning apparatus includes a target MR obtaining module, a target feature vector module, and a track prediction module. The target MR module is configured to obtain a plurality of target MRs of a target terminal in a target region and an engineering parameter of at least one base station in the target region, where the target region is a predetermined geographical region, and each of the plurality of target MRs includes parameter information. The target feature vector module is configured to obtain, based on the parameter information in each of the plurality of target MRs and the engineering parameter of the at least one base station that are obtained by the target MR module, a target feature vector corresponding to each of the plurality of target MRs. The track prediction module is configured to obtain a movement track of the target terminal based on the target feature vector that corresponds to each of the plurality of target MRs and that is obtained by the target feature vector module. The apparatus for calculating an emission probability inputs an emission probability into the track prediction module, and the apparatus for calculating a transition probability inputs a transition probability into the track prediction module.

According to a ninth aspect, this application provides an apparatus for calculating an emission probability, where the apparatus for calculating an emission probability includes a memory and a processor. The memory is configured to store a programmable instruction. The processor may invoke the programmable instruction stored in the memory, to implement the method according to any one of the first aspect or the possible implementations of the first aspect.

According to a tenth aspect, this application provides an apparatus for calculating a transition probability, where the apparatus for calculating a transition probability includes a memory and a processor. The memory is configured to store a programmable instruction. The processor may invoke the programmable instruction stored in the memory, to implement the method according to any one of the second aspect or the possible implementations of the second aspect.

According to an eleventh aspect, this application provides a sequence positioning apparatus, where the sequence positioning apparatus includes a memory and a processor. The memory is configured to store a programmable instruction. The processor may invoke the programmable instruction stored in the memory, to implement the method according to any one of the third aspect, the fourth aspect, or the possible implementations of the fourth aspect.

According to a twelfth aspect, this application provides a computer readable storage medium, including an instruction. When the instruction runs on a computer, the computer is enabled to perform the method according to any one of the first aspect or the possible implementations of the first aspect, according to any one of the second aspect or the possible implementations of the second aspect, or according to any one of the third aspect, the fourth aspect, or the possible implementations of the fourth aspect.

According to a thirteenth aspect, this application provides a computer program product including an instruction. When the instruction runs on a computer, the computer is enabled to perform the method according to any one of the first aspect or the possible implementations of the first aspect, according to any one of the second aspect or the possible implementations of the second aspect, or according to any one of the third aspect, the fourth aspect, or the possible implementations of the fourth aspect.

According to a fourteenth aspect, this application provides a sequence positioning system, where the sequence positioning system includes the apparatus for calculating an emission probability according to the ninth aspect, the apparatus for calculating a transition probability according to the tenth aspect, and a sequence positioning apparatus. The sequence positioning apparatus includes a processor and a memory. The memory is configured to store a programmable instruction. The processor invokes the programmable instruction stored in the memory, to perform the following operations obtaining a plurality of target MRs of a target terminal in a target region and an engineering parameter of at least one base station in the target region, where the target region is a predetermined geographical region, and each of the plurality of target MRs includes parameter information, obtaining, based on the parameter information in each of the plurality of target MRs and the engineering parameter of the at least one base station, a target feature vector corresponding to each of the plurality of target MRs, and inputting, into a sequence positioning model, the target feature vector corresponding to each of the plurality of target MRs, to obtain a movement track of the target terminal.

According to the sequence positioning method provided in this application, an emission probability obtained based on feature vectors obtained based on a plurality of pieces of parameter information in MRs and engineering parameters of corresponding base stations can express more complex observed information, thereby further improving accuracy and reliability of a movement track recovered/predicted through sequence positioning. Alternatively, a transition probability obtained using real track data from a third party is used for sequence positioning such that smoothness of a recovered/predicted movement track can be improved, and the obtained movement track is more reliable.

DESCRIPTION OF EMBODIMENTS

The following describes the technical solutions of the embodiments of this application with reference to the accompanying drawings.

Figure 1:
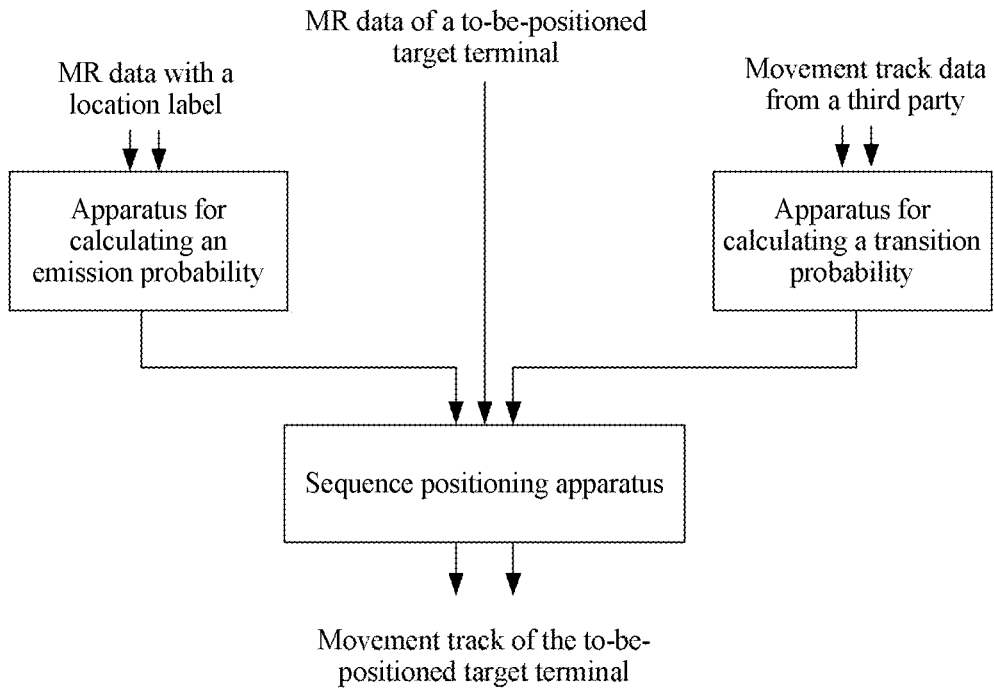
FIG. 1 is a schematic structural diagram of a sequence positioning system according to this application.

An embodiment of this application describes a positioning system. The system is configured to position a telecommunication user to recover a movement track of the telecommunication user. As shown in FIG. 1, the positioning system includes an apparatus for calculating an emission probability, an apparatus for calculating a transition probability, and a sequence positioning apparatus. The apparatus for calculating an emission probability, the apparatus for calculating a transition probability, and the sequence positioning apparatus perform data communication with each other using a data link. The apparatus for calculating an emission probability is configured to calculate an emission probability used for sequence positioning, where input is MR data with a location label, and output is an emission probability. The apparatus for calculating a transition probability is configured to calculate a transition probability used for sequence positioning, where input is movement track data, and output is a transition probability. The sequence positioning apparatus is configured to recover a movement track of a to-be-positioned terminal/device based on the emission probability, the transition probability, and MR data of the to-be-positioned terminal/device, where input is a string of MRs (without location information) of the to-be-positioned target terminal, and output is the movement track of the to-be-positioned target terminal. It should be noted that the sequence positioning apparatus may be alternatively used for single-point positioning, that is, input is one MR, and output is one corresponding location. The following further describes structures and functions of the apparatus for calculating an emission probability, the apparatus for calculating a transition probability, and the sequence positioning apparatus with reference to the accompanying drawings. Details are not described herein. It should be noted that the apparatus for calculating an emission probability, the apparatus for calculating a transition probability, and the sequence positioning apparatus may alternatively form an integral device. The apparatus for calculating an emission probability is an emission probability calculation module of the integral device, the apparatus for calculating a transition probability is a transition probability calculation module of the integral device, and the sequence positioning apparatus is a sequence positioning module of the integral device. Functions of each module are the same as functions of a corresponding apparatus, and data may be transmitted between the modules. Optionally, functions implemented by each of the emission probability calculation module, the transition probability calculation module, and the sequence positioning module or implemented by the integral device formed by the foregoing three function modules are implemented using software or software and hardware.

Usually, the positioning system may be deployed on a big data analytics platform. When daily MRs are stored on the platform, the MRs are first input into the positioning system. The positioning system extracts features based on the MRs, predicts, using a model obtained through offline training, a latitude and longitude location recorded in each MR, and adds the latitude and longitude location into the MR. The MR with the latitude and longitude location may be used for further analysis and modeling.

Figure 2:
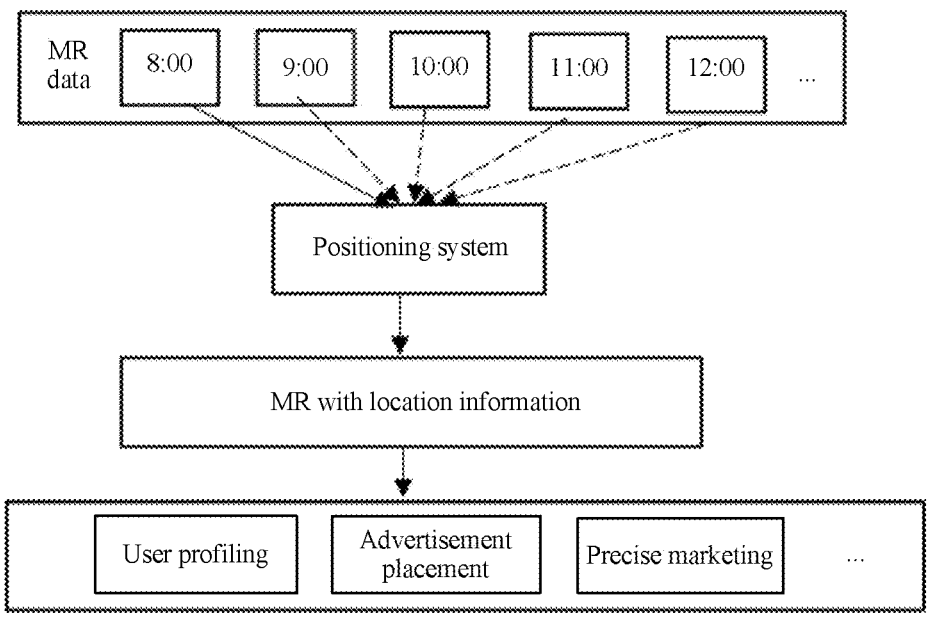
FIG. 2 is a schematic diagram of an application scenario of a sequence positioning system according to this application.

An embodiment of this application describes an application scenario. As shown in FIG. 2, in this application scenario, the positioning system described in the foregoing embodiment may be used as a component of a big data analytics platform of an operator, to hourly or daily input, into the positioning system, MRs uploaded by a mobile device to a pipeline of the operator. The positioning system obtains corresponding location information for each MR that is input into the positioning system, and adds the corresponding location information into the MR. Subsequently, these MRs into which location information has been added may be used by the operator to perform user profiling, traffic prediction, outdoor advertisement placement policy optimization, and the like.

Figure 3:
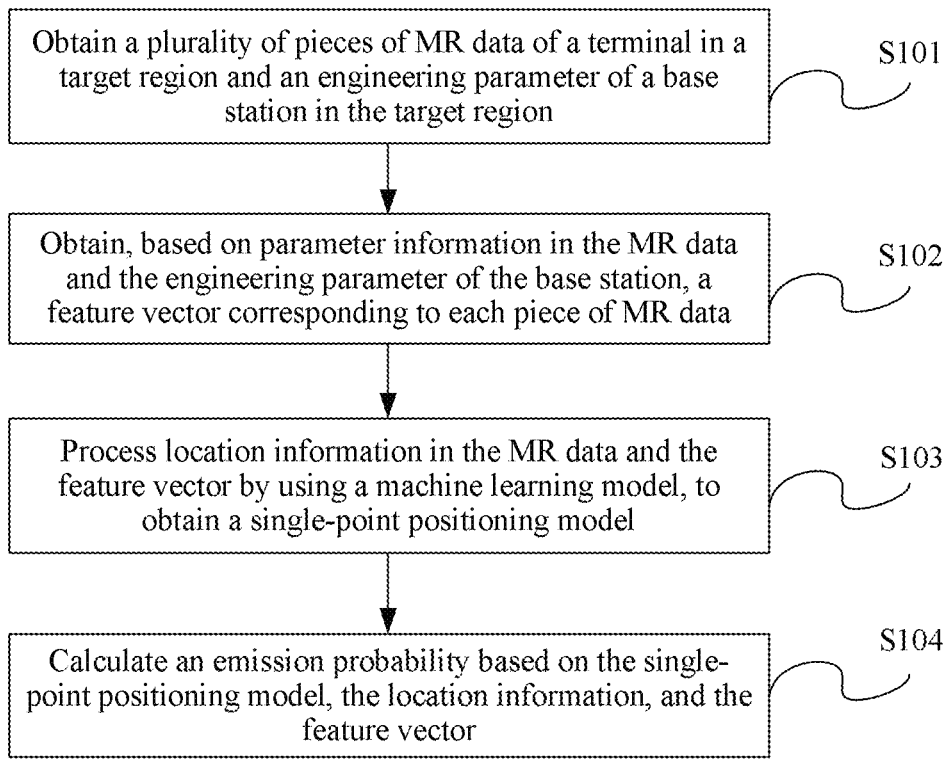
FIG. 3 is a flowchart of a method for obtaining an emission probability according to this application.

An embodiment of this application describes a method for obtaining an emission probability. As shown in FIG. 3, the method includes the following steps.

S101. Obtain a plurality of MRs of a terminal in a target region and an engineering parameter of a base station in the target region. The target region is a specific geographical region such as a suburb, an urban region, a city, or a rural region, and an area size, an administrative region, and a geographical location are not limited. Each MR includes location information and parameter information, and the location information is used to label a location of a corresponding terminal in the target region.

The parameter information includes an environment parameter. The environment parameter is used to indicate a real environment in which a corresponding terminal generates an MR, for example, at least one of time period information, weather information, and event information. The environment parameter is used as a feature, and different emission probabilities are obtained based on different environments such that positioning in different environments can be more accurately supported. In an embodiment, a peak time period and a non-peak time period are used as examples. An environment parameter corresponding to the peak time period is represented by 1, and an environment parameter corresponding to the non-peak time period is represented by 0. Positioning a terminal in the target region in the peak time period using an emission probability obtained based on an MR with the environment parameter 1 is more accurate. Similarly, positioning a terminal in the target region in the non-peak time period using an emission probability obtained based on an MR with the environment parameter 0 is more accurate.

S102. Obtain, based on the parameter information and the engineering parameter, a feature vector corresponding to each MR. For example, matching is performed between the MRs and the engineering parameter of the base station based on base station IDs in the parameter information, to obtain an associated engineering parameter of each MR. The associated engineering parameter of each MR and the information parameter in the MR are combined to generate the feature vector corresponding to the MR. In implementation, an information parameter in an MR may include one or more base station IDs. This also indicates that a terminal corresponding to the MR is connected to one or more base stations at a same time. When parameter information in an MR terminal includes a plurality of base station IDs, an association engineering parameter of the MR is a set of engineering parameters of base stations indicated by the plurality of base station IDs.

S103. Process the location information and the feature vector using a machine learning model, to obtain a single-point positioning model. For example, the location information in each MR and the feature vector corresponding to the MR constitute a training set, and the training set corresponding to each MR is input to the machine learning model for training, to obtain the single-point positioning model. Optionally, the single-point positioning model may be directly used to position a to-be-positioned terminal in the target region, where input of the single-point positioning model is a feature vector including parameter information in an MR of the to-be-positioned terminal and the engineering parameter of the base station, and output is location information of the to-be-positioned terminal. Optionally, the machine learning model is a regression model such as linear regression or a random forest.

S104. Calculate an emission probability based on the single-point positioning model, the location information, and the feature vector. The emission probability includes at least one emission probability value, and the emission probability value is used to indicate a mapping relationship in which a feature vector used as an observed value corresponds to a piece of location information used as a hidden value. For example, the location information in each MR and the feature vector corresponding to the MR are input into the single-point positioning model to obtain a mapping relationship, where the mapping relationship is used to indicate a correspondence between a feature vector and location information, and the emission probability of the feature vector corresponding to each MR is calculated based on the mapping relationship. It should be noted that the location information and the feature vector that are used in S104 and the location information and the feature vector that may be used in S101 to S103 are not necessarily obtained based on a same MR. A reason lies in that a large quantity of MRs need to be obtained, and using a same MR avoids implementation of a step of obtaining data again. In addition, in terms of result, when an MR base is large enough, whether to use different MRs has relatively small impact on a result.

A possible implementation of calculating an emission probability is as follows.

A single-point positioning model is trained, and then model space of the single-point positioning model is used to calculate an emission probability. For example, the following steps are included.

First, MRs of a plurality of mobile terminals in a preset geographical region are obtained. The MRs each include a location label, for example, Global Positioning System (GPS) information carried in the MR. In addition, some other data in a telecommunications network is obtained, for example, an engineering parameter of a base station. The engineering parameter mainly includes information such as a base station ID, a latitude and longitude location, an antenna height, and an antenna azimuth.

Then, a positioning-related feature is extracted, as a feature vector of a corresponding MR, from the obtained data using a feature engineering method. The feature vector may include an engineering parameter of a connected base station, an engineering parameter of a base station in a neighboring cell, signal strength of a connection, and the like. For example, matching is performed between the MR that carries the GPS information and the engineering parameter of the base station based on a base station ID, to find corresponding parameter information in the engineering parameter for each base station in the MR. Further, some simple feature engineering parameters are added into data obtained after the matching, for example, a quantity of connected base stations in each MR, where different base stations are at different latitude and longitude locations, or a quantity of sectors, where a plurality of sectors may be at a same latitude and longitude location. In this way, a feature vector may be created for each MR, and a feature vector and a location label corresponding to a same MR form a training set corresponding to the MR, to train a single-point positioning model.

Table 1 provides some telecommunication features for training a positioning model, including some original fields in the MR and some fields in the engineering parameter of the base station. Features with * indicate that these fields correspond to a connected base station and a base station in a neighboring cell that correspond to a same MR. Therefore, a same field appears in a feature vector a plurality of times, and corresponds to different base stations.

TABLE 1

List of features used in a positioning model

| Feature name | Description |
| --- | --- |
| RNCID* | ID of an radio network controller (RNC) device |
| CellID* | Cell ID |
| RSCP* | Received signal code power |
| Ec/No* | Signal-to-noise ratio |
| RSSI* | Received signal strength indicator |
| Antenna height* | Antenna height |
| Antenna azimuth* | Antenna orientation |
| Mechanical downtilt angle* | Mechanical downtilt angle |
| Electrical downtilt angle* | Electrical downtilt angle |
| Sector latitude* | Latitude of a location of an antenna |
| Sector longitude* | Longitude of a location of an antenna |
| Base station type* | Base station type (a macro base station or an indoor distributed base station) |
| Base station manufacturer* | Base station device manufacturer (Huawei, Nokia Siemens Networks, or the like) |
| Quantity of sectors to which a device is connected | Quantity of connected sectors in the MR |
| Quantity of base stations to which a device is connected | Quantity of connected sectors at different locations |

Further, environment information is extracted from the MR as an environment parameter, for example, weather information (a sunny day, a rainy day, a snowy day, or the like), a time period (a peak time period, a non-peak time period, a work day, a weekend, or an official holiday), and event information (a sports meeting, a concert, a national celebration, and the like). The environment parameter and the telecommunication feature in Table 1 form a feature vector, and the feature vector and a corresponding location label form a training set.

Next, all training sets obtained in the foregoing step are input to a machine learning regression model for training, to obtain a corresponding model, namely, the single-point positioning model. There may be a plurality of types of machine learning regression models such as linear regression and a random forest. Usually, for training of a single-point positioning model in a relatively large region, the region is divided into blocks, and a single-point positioning model is trained for each block. In this way, different features in different regions can be learned, for example, two models are trained for an urban region and a suburb.

Finally, the feature vector obtained in the foregoing step or a feature sequence obtained based on another MR sample with a location label is used as an observed value, and the location label is used as a hidden state. The observed value and the hidden state are input into the single-point positioning model obtained in the foregoing step. In this case, model space of the single-point positioning model may be analyzed to obtain a correspondence between a location label and a feature vector in order to obtain P (feature vector|location).

Model space of different models corresponds to different calculation manners. The following uses a random forest as an example to describe a model space analysis method and an emission probability calculation manner. Details are described as follows.

Figure 4:
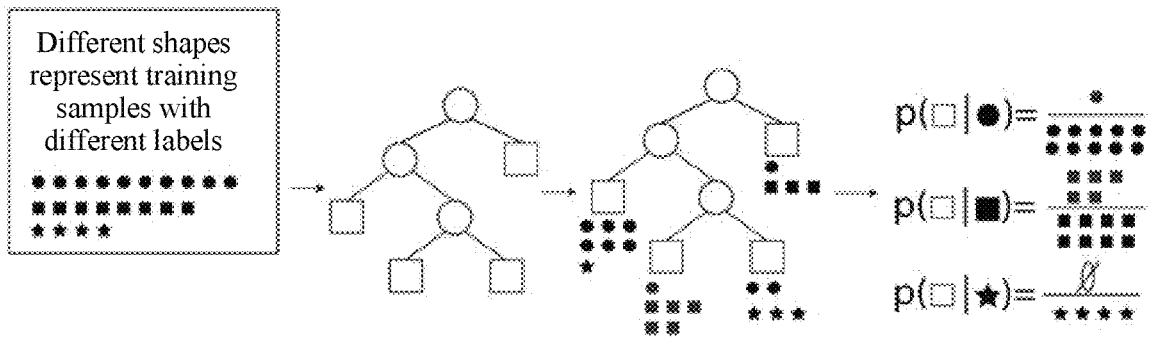
FIG. 4 is a schematic diagram of calculating an emission probability according to this application.

After a sample (including a feature vector and a location label) is input to a random forest, a feature value of the sample and a splitting feature value of a decision node are continuously compared, to select a left child node or a right child node, until a leaf node is finally selected. Therefore, each leaf node in the random forest may be considered as a series of feature vectors (which are obtained using splitting features of a series of decision nodes), and one leaf node is considered as one observed value. In this case, an emission probability is changed to a probability P (leaf node|label) of obtaining a leaf node using a given label. As shown in FIG. 4, labeled samples are input into a trained tree model, and a corresponding leaf node in the tree can be found for each labeled sample (as shown in a third part in FIG. 4). In this way, an emission probability value may be obtained by dividing a total quantity of labeled samples with a same label by a quantity of the labeled samples falling on the leaf node. For example, there are 10 dot samples in total, and only one dot sample falls on a leaf node on the rightmost side of the third picture in FIG. 4. In this case, an emission probability value is $\frac{1}{10}$. This indicates that a degree of matching between a location of a labeled sample and an observed value (a probability that a similar observed value may be obtained at the location). A higher matching degree indicates that a predicted location is more accurate.

Figure 5:
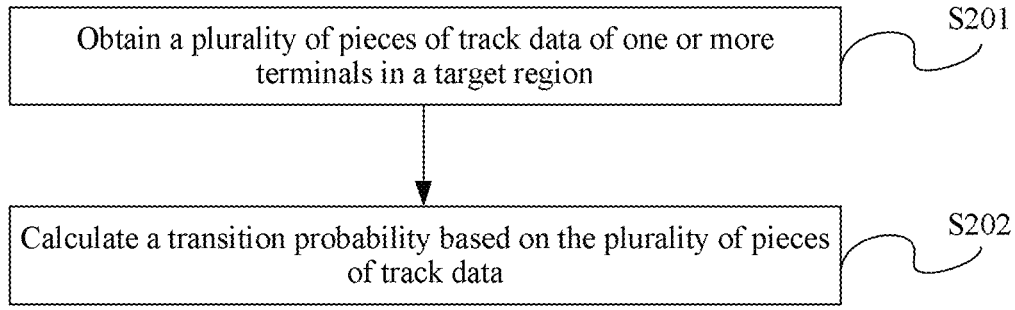
FIG. 5 is a flowchart of a method for obtaining a transition probability according to this application.

An embodiment of this application describes a method for obtaining a transition probability. As shown in FIG. 5, the method includes the following steps.

S201. Obtain a plurality of pieces of track data of one or more terminals in a target region, where the target region is a specific geographical region such as a suburb, an urban region, a city, or a rural region, and an area size, an administrative region, and a geographical location are not limited. Each piece of track data includes at least two pieces of location information. The location information is used to label a location of a terminal in the target region. Each piece of location information corresponds to a time stamp. The time stamp is used to indicate a moment at which the terminal generates corresponding location information. In implementation, the track data may be obtained from a third-party platform, for example, Didi Chuxing or a traffic data publishing platform.

Optionally, the obtaining a plurality of pieces of track data of one or more terminals in a target region includes obtaining track data of the terminal in the target region in a peak traffic time period, or obtaining track data of the one or more terminals in the target region in a non-peak traffic time period, or obtaining track data of the one or more terminals in a preset time period. Certainly, an optimal effect is achieved by applying a transition probability obtained based on track data of the terminal obtained in a time period to sequence positioning in the same time period, and the transition probability may also be applied to sequence positioning in a time period similar to the time period.

S202. Calculate a transition probability based on the plurality of pieces of track data, where the transition probability includes at least one transition probability value, and the transition probability value is used to indicate a probability that movement is performed from a piece of location information (a start location) to another piece of location information (an arrival location) after a time interval T. For example, the obtained plurality of pieces of track data are processed to obtain a combination sequence of each piece of track data. Any two pieces of location information in one piece of track data and a time interval between the any two pieces of location information form a combination sequence. One piece of track data may have one or more combination sequences. For two pieces of location information in one combination sequence, one piece of location information is used as a start location, and the other piece of location information is used as an arrival location. In this case, the combination sequence indicates that movement is performed from the start location to the arrival location after a time interval. In all the obtained combination sequences, combination sequences including a preset condition are obtained through screening. The preset condition is a preset start location and a preset time interval. Different combination sequences are obtained through screening based on different preset conditions. In the combination sequences that meet the preset condition and that are obtained through screening, the arrival location is used as an object to count quantities of different arrival locations and calculate corresponding probability values that the quantities of different arrival locations occupy in all the combination sequences that meet the preset condition, namely, transition probability values. A set of all the calculated probability values is a transition probability corresponding to the preset condition. Optionally, the preset time interval in the preset condition may be a time interval or a time interval range. For example, the preset time interval is 2 seconds, or the preset time interval is 2 seconds to 4 seconds, that is, if a time interval meets the range of 2 seconds to 4 seconds, the time interval meets the preset time interval in the preset condition.

Optionally, before the transition probability is calculated based on the plurality of pieces of track data, defective track data is removed from the plurality of pieces of track data. The defective track data is track data in which location information deviates from a road in the target region by a distance greater than a threshold, or is track data in which a distance between two pieces of adjacent location information is greater than a threshold. The plurality of pieces of track data obtained after the defective track data is removed are used to calculate the transition probability. This can improve reliability of the transition probability or smoothness of transition between two adjacent locations.

Optionally, before the transition probability is calculated based on the plurality of pieces of track data, sparse track data in the track data is obtained through interpolation for densification. The sparse track data is track data in which a distance between any two pieces of adjacent location information is greater than a third threshold. Interpolation means adding one or more pieces of location information between adjacent pieces of location information based on map information and track data such that the location information in the track data is dense. For example, the location information may be added based on a time interval. For example, a track includes only two locations, and a time interval between the two locations is 6 seconds. To obtain a time interval of 3 seconds, one location is inserted between the two locations such that a time interval between locations in the track may be 3 seconds. Based on the foregoing example, to obtain a time interval of 1 second, five locations are inserted between the two locations, that is, one location is inserted every 1 second such that a time interval between locations in the track may be 1 second. Specific geographic location information of the inserted location may be relatively accurately determined based on map information and the track.

Optionally, the plurality of pieces of track data each include an environment parameter indicating an environment in which a corresponding terminal moves to generate a corresponding track, for example, at least one of time period information, weather information, and event information. The track data can be classified based on the environment parameter. Track data including a same environment parameter is obtained from existing tracks including different environment parameters, for example, track data in a peak time period or track data during raining. Different transition probabilities can be obtained based on track data including different environment parameters, for example, an obtained transition probability corresponding to a raining environment is used to position a terminal in the target region during raining. The method for obtaining a transition probability described in this embodiment of this application is to use a transition concept to apply a motion pattern learned from real track data to calculating the transition probability.

A possible implementation of calculating a transition probability is as follows.

First, a batch of third-party track data in a to-be-positioned region is obtained. Then, a track with a relatively large deviation is removed from the data. A large deviation is mainly reflected in that a point in the track is relatively far from a road or a point that frequently appears in the track immediately jumps to a far place. Subsequently, less dense track data is densified using a map matching and interpolation method such that a transition probability at a relatively fine granularity (a time interval between two adjacent points in the track is as small as possible) can be obtained. Finally, track-point coordinates need to be discretized, and the entire to-be-positioned region is evenly divided into rectangular grids (a grid size is approximately 20 meters (m)*20 m) such that each coordinate can uniquely correspond to one grid ID.

A transition probability calculation process may be divided into two processes track densification and transition probability learning.

The track densification process is to learn a transition probability corresponding to any time interval. For example, first, each track is mapped to a road network using a map matching algorithm such that a road through which each track passes can be estimated. Then, interpolation is evenly performed along the road through which the track passes such that a time interval between two adjacent points after the interpolation is 1s. In this way, the transition probability corresponding to any time interval at a granularity of second can be learned.

Figure 6:
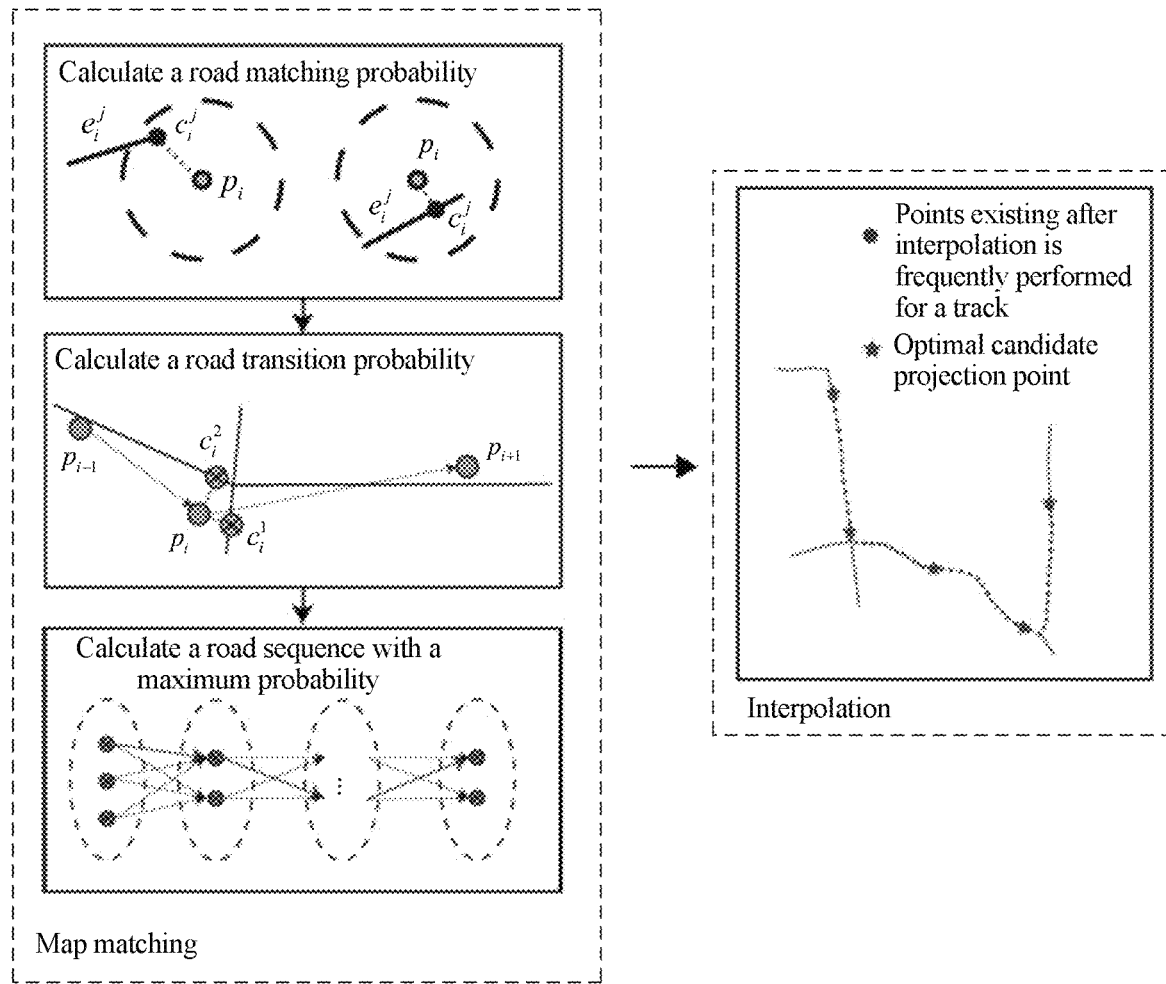
FIG. 6 is a schematic diagram of a map matching and interpolation method according to this application.

FIG. 6 shows a method for implementing map matching and interpolation. There are a plurality of map matching methods. For example, a map matching method for a track with a low sampling frequency is used. A mapping probability from an original track point to a nearby road and a transition probability between roads are calculated, to obtain a road sequence with a maximum probability. After a matched path is obtained, interpolation is evenly performed between adjacent points in the track, until a time interval between two adjacent points is equal to 1s.

The transition probability learning process is mainly to learn, from a track, a transition probability from each location to another location, and there are many specific learning manners.

Figure 7:
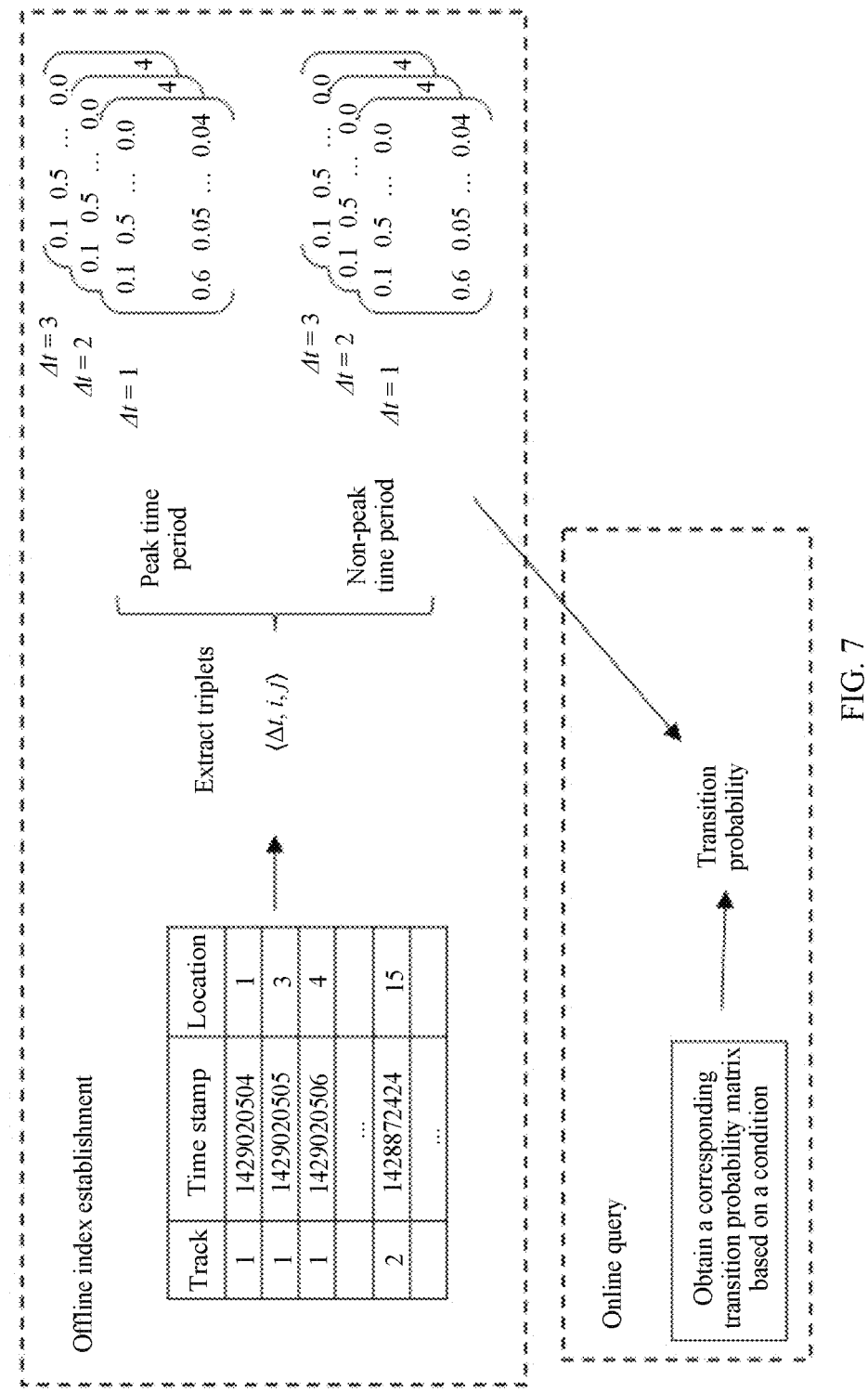
FIG. 7 is a schematic diagram of a method for calculating a transition probability in an offline index manner according to this application.

An embodiment of this application describes a method for learning a transition probability in an offline index manner. As shown in FIG. 7, the manner is divided into two parts. An upper part is offline index establishment, and a lower part is online query.

A total of three steps are required during offline index establishment. In a first step, track data is processed into data in a form of a table in FIG. 7. The table includes a total of three columns (a track ID, a time stamp, and a grid ID), and each row represents a record of a track point. Next, in a second step, triplets ($\Delta t$, i, j) are extracted from the table, where $\Delta t$ is a difference between time stamps corresponding to two records, and i and j are respectively grid IDs corresponding to the two records. Every two of records corresponding to a same track ID can be used to generate a triplet, and this indicates that movement can be performed from a grid i to a grid j within the time $\Delta t$. In an embodiment, only records meeting $\Delta t$<60s need to be extracted. In a third step, statistics about the triplets generated in the second step are collected, to obtain a transition probability matrix. For example, for a probability of arriving at another grid from a grid 1 within 1s, only all triplets (1, 1, j) meeting $\Delta t$=1 and i=1 need to be found, and then a transition probability vector may be obtained by collecting statistics about frequencies that different j appears, namely, a transition probability that meets the condition $\Delta t$=1 and i=1. The transition probability matrix (a same transition time interval) may be obtained based on different start grids i, and then different transition probability matrices may be obtained based on different transition time intervals. In addition, for more in line with reality, transition probabilities in a peak time period and a non-peak time period are differentiated. Track data in the peak time period (for example, 7:00 to 9:00 or 17:00 to 19:00) is used to generate a transition matrix in the peak time period, and track data in another time period is used to generate a transition matrix in the non-peak time period.

The online query process is mainly as follows. During sequence positioning, under a condition of a given transition time interval and a given start grid, a probability distribution vector of arriving at another grid is obtained. First, a corresponding offline index is selected based on whether a current time is a peak time period. Then, a corresponding transition probability matrix is selected based on a time interval $\Delta t$. Finally, a corresponding row in the transition probability matrix is found based on a start grid i, namely, a required transition probability vector.

Figure 8:
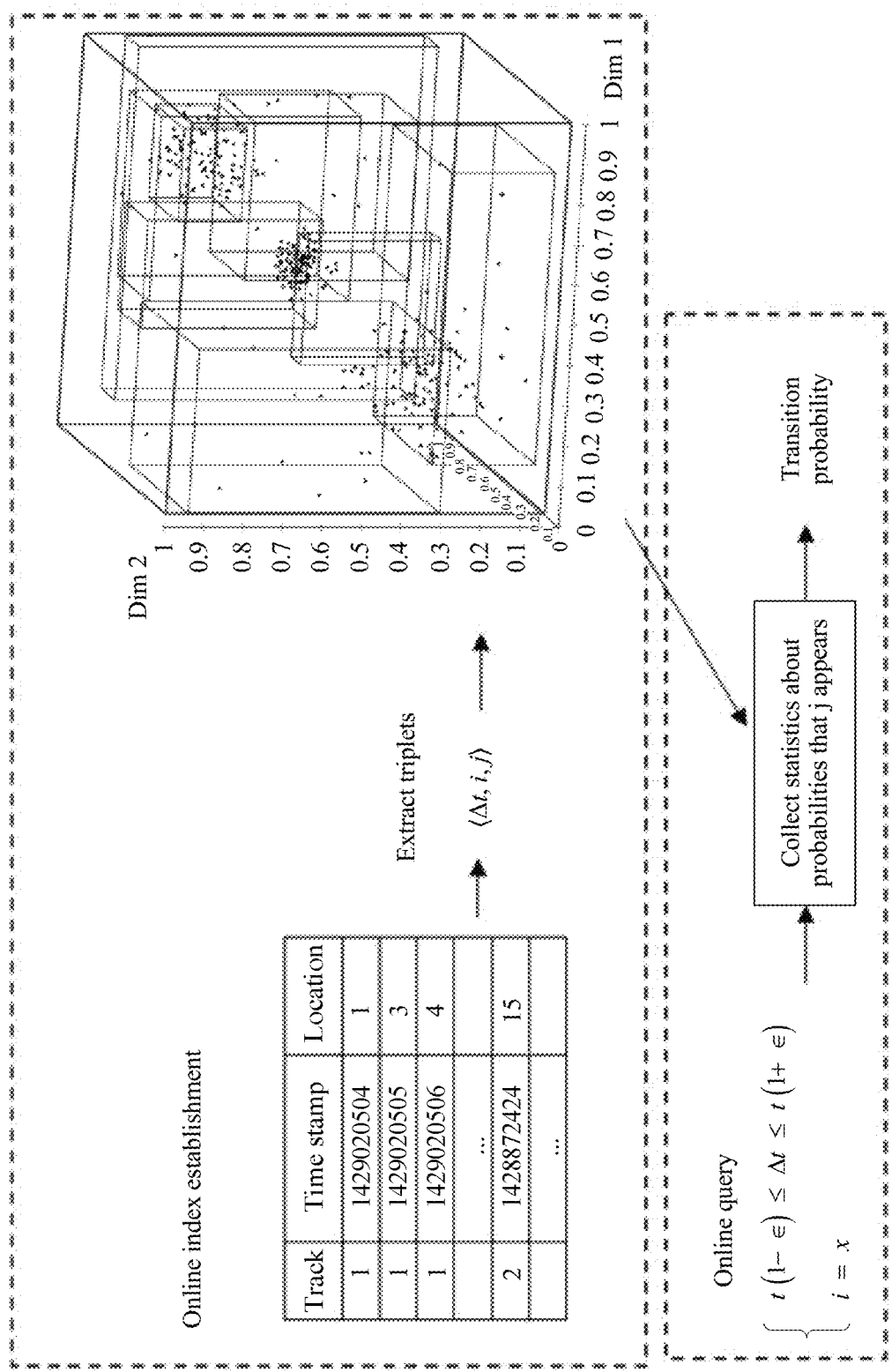
FIG. 8 is a schematic diagram of a method for calculating a transition probability in an online index manner according to this application.

An embodiment of this application describes a method for calculating a transition probability in an online index manner. As shown in FIG. 8, the manner may also be divided into three steps, and the first two steps are the same as those in the offline index. First, track data is processed into data in a form of a table of three columns (a track ID, a time stamp, and a grid ID). Then, triplets ($\Delta t$, i, j) are extracted from the table. Next, RTree is used to establish three-dimensional indexes for all the extracted triplets ($\Delta t$, i, j) (three elements in the triplet respectively correspond to three dimensions of indexes).

During online query, (Range Query) is queried using a range of RTree. Ranges of $\Delta t$ and i are given, for example, $1 \le \Delta t \le 2$ and $1 \le i \le 1$, RTree can return all triplets that meet the condition. Subsequently, all the third elements j are extracted from the triplets, and transition probability distribution is obtained based on value distribution of j. Different from the offline index, in the online index, a time interval may be set to a range, for example, 1s to 2s specified in the foregoing example.

Figure 9:
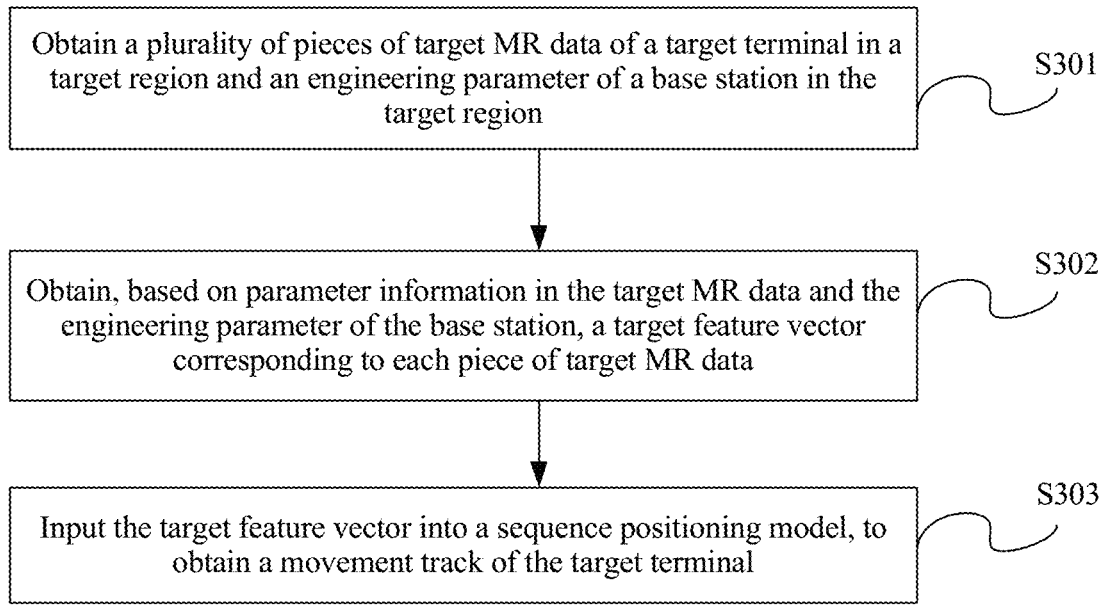
FIG. 9 is a flowchart of a sequence positioning method according to this application.

An embodiment of this application describes a sequence positioning method. As shown in FIG. 9, the method includes the following steps.

S301. Obtain a plurality of target MRs of a target terminal in a target region and an engineering parameter of a base station in the target region, where each target MR includes parameter information, and the parameter information includes an environment parameter. For details, refer to the foregoing descriptions of a corresponding embodiment.

S302. Obtain a target feature vector based on the parameter information in the target MR and the engineering parameter of the base station, where each target MR corresponds to a target feature vector, and the target feature vector is used as an observed value, and is used to be input into a sequence positioning model to obtain a corresponding hidden location.

S303. Input the obtained target feature vector into the sequence positioning model, to obtain a movement track of the target terminal. An emission probability and a transition probability applied to the sequence positioning model are calculated using the method for obtaining an emission probability and the method for obtaining a transition probability that are described in the foregoing embodiments. Details are not described herein again. It should be noted that a target region for obtaining the emission probability and the transition probability and the target region for sequence positioning are a same geographical region. Similarly, a time period for obtaining the emission probability and the transition probability and a time period for sequence positioning are also a same time period. In this way, a better effect can be achieved.

Figure 10:
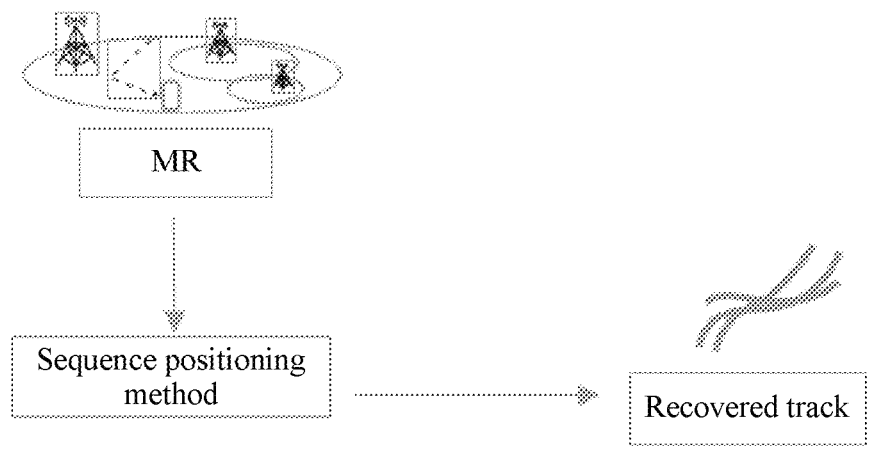
FIG. 10 is a schematic diagram of recovering a track based on a sequence positioning method according to this application.

After both the emission probability and the transition probability are obtained, the sequence positioning method can be used to recover a track of a user. As shown in FIG. 10, same as a method for obtaining a feature vector when the emission probability is calculated, herein, an MR of a to-be-positioned terminal also needs to be processed to generate a corresponding feature vector. A series of feature vectors of the same to-be-positioned terminal and the previously obtained emission probability and transition probability are input into the sequence positioning method such that the algorithm can be used to predict a movement track of the to-be-positioned terminal based on a feature sequence.

Figure 11:
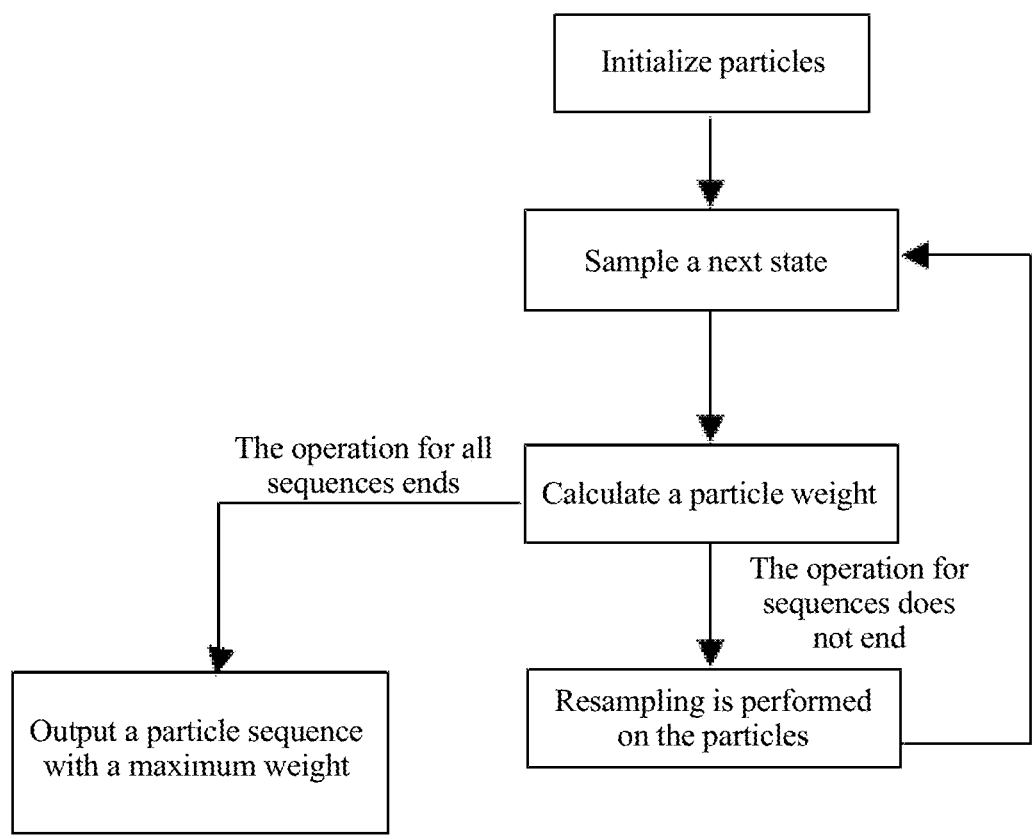
FIG. 11 is a schematic diagram of a particle-filtering-based sequence positioning method according to this application.

There are a plurality of sequence positioning methods. As shown in FIG. 11, an embodiment of this application describes a particle-filtering-based sequence positioning method. An idea of particle filtering is to find a particle sequence with a length T (the length is the same as a length of a to-be-recovered track) such that the sequence is most consistent with feature vectors corresponding to MRs.

In a first step, particles are initialized in state space to generate a particle set $P=\{p^{\hat{}}((1)), p^{\hat{}}((2)), \ldots, p^{\hat{}}((N))\}$. Each particle corresponds to a state and an importance weight $<x\_1^{\hat{}}((i)), w\_1^{\hat{}}((i))>$ (the superscript i indicates a sequence number of a particle, and the subscript 1 indicates that the particle corresponds to the first point in a track). Usually, there are hundreds to thousands of particles. Each initialized particle forms a particle sequence in a subsequent step through state transition, and random initialization is performed on an initial state in a suitable range (for example, within coverage of hundreds of meters of a connected base station). The importance weight is an emission probability $p(y|x)$, namely, a probability of obtaining an observed value using a given state. According to the foregoing method for calculating an emission probability, a state (equivalent to a label) of a particle is input to obtain a corresponding emission probability value.

In a second step, sampling is performed. Then, a next state is sampled based on a current state x_j^((i)) of each particle and a time interval Δt_j between two adjacent points in an MR. Herein, the offline index in the foregoing embodiment is used. After Δt_j and x_j^((i)) are input using the foregoing online query method, state transition probability distribution p(x_(j+1)^((i))|x_j^((i))) is obtained. A state is sampled from the distribution as a state x_(j+1)^((i)) of an ith particle at a (j+1)th moment.

In a third step, decision making is performed. A corresponding importance weight w_(j+1)^((i))=w_j^((i))p(y_(j+1)|x_(j+1)^((i))) is calculated based on x_(j+1)^((i)) and w_j^((i)). Normalization is performed on importance weights of all particle sequences such that importance distribution can be obtained. After the second and third steps are completed, lengths of all the particle sequences in the particle set are increased by 1.

In a fourth step, resampling is performed. If distribution of the importance weights of all the particle sequences meets a specific condition, resampling is performed for the particles. Resampling is a process in which sampling with replacement is performed. Sampling is performed based on values of the weights. If a particle sequence has a larger weight, a probability that sampling is performed on the particle sequence is higher (sampling may be performed on the particle sequence a plurality of times). The particle sequences existing before resampling is performed are replaced with the particle sequences existing after resampling is performed (quantities of sequences before and after sampling are the same). If a current particle sequence length is less than T, the importance weights of all the particle sequences need to be reset to 1/N.

The second, third, and fourth steps are repeated, until the particle sequence length is equal to T. In this case, a particle sequence with a largest importance weight is output as a predicted track, and one particle sequence corresponds to a string of states, namely, a string of latitude and longitude locations.

An embodiment of this application describes a Viterbi sequence positioning method. A dynamic planning idea is used in the method. A matrix V_(t,k) is continuously updated, and the matrix indicates a probability that final states of the first t sequences are a state sequence k. Each time when V_(t+1,k) is calculated, a maximum value of V_(t,x)*a_(x,k) needs to be found, where x is a variable, that is, a most suitable state prior to k needs to be found, and a_(x,k) is a calculated transition probability, namely, a probability that movement is performed from a grid x to a grid k. Then, V_(t+1,k)=b_y(k)*max((V)_(t,x)*a_(x,k)), where b represents a calculated emission probability. In this way, after all V matrix values are updated, a maximum value can be found in a row V_(T,k), and then the previous state (a state meeting the maximum value in the foregoing formula) is found through tracing, until a state transition sequence is obtained.

Figure 12:
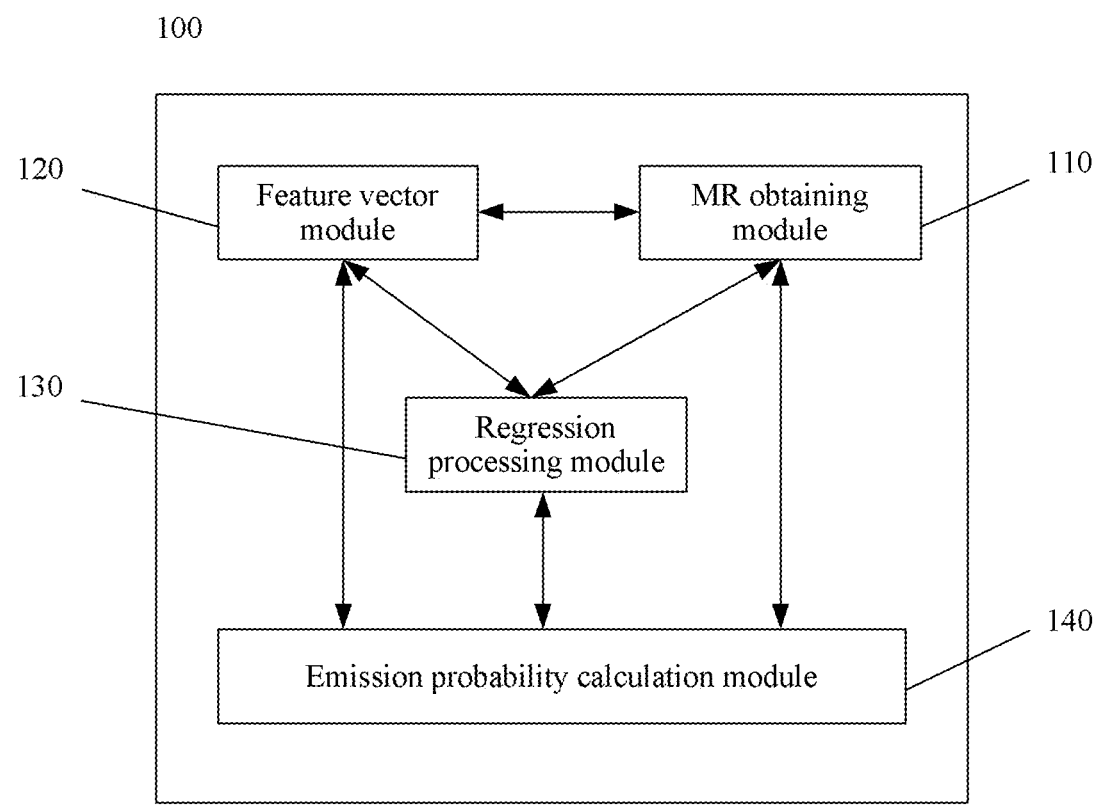
FIG. 12 is a schematic diagram of an apparatus for calculating an emission probability according to this application.

An embodiment of this application describes an apparatus for calculating an emission probability. As shown in FIG. 12, the apparatus 100 for calculating an emission probability includes an MR obtaining module 110, a feature vector module 120, a regression processing module 130, and an emission probability calculation module 140. The MR obtaining module 110 is configured to obtain a plurality of MRs of a terminal in a target region and an engineering parameter of at least one base station in the target region, where the target region is a predetermined geographical region, each of the plurality of MRs includes location information and parameter information, and the location information is used to indicate a location of a corresponding terminal in the target region. The feature vector module 120 is configured to obtain, based on the parameter information in each of the plurality of MRs and the engineering parameter of the at least one base station that are obtained by the MR obtaining module 110, a feature vector corresponding to each of the plurality of MRs. The regression processing module 130 is configured to obtain a single-point positioning model based on the location information in each of the plurality of MRs obtained by the MR obtaining module 110 and the feature vector that corresponds to each of the plurality of MRs and that is obtained by the feature vector module 120. The emission probability calculation module 140 is configured to calculate, based on the single-point positioning model obtained by the regression processing module 130, the location information in each of the plurality of MRs obtained by the MR obtaining module 110, and the feature vector that corresponds to each of the plurality of MRs and that is obtained by the feature vector module 120, an emission probability of the feature vector corresponding to each of the plurality of MRs, where the emission probability includes at least one emission probability value, and the emission probability value is used to indicate a probability that a feature vector corresponds to a piece of location information.

Further, the parameter information in each of the plurality of MRs includes at least one base station ID, the base station ID is used to indicate a base station to which a terminal corresponding to an MR including the base station ID is connected, and the at least one base station includes at least base stations indicated by base station IDs included in the plurality of MRs. The feature vector module 120 is further configured to match, based on the base station IDs, the plurality of MRs obtained by the MR obtaining module 110 with the engineering parameter of the at least one base station obtained by the MR obtaining module 110, to obtain an associated engineering parameter of each of the plurality of MRs, where an associated engineering parameter of any MR includes an engineering parameter of a base station indicated by each base station ID in the any MR, and obtain, based on the associated engineering parameter and the parameter information of each of the plurality of MRs obtained by the MR obtaining module, the feature vector corresponding to each of the plurality of MRs, where any feature vector includes an associated engineering parameter and parameter information of one MR.

Further, the regression processing module 130 is further configured to obtain, based on the location information in each of the plurality of MRs obtained by the MR obtaining module 110 and the feature vector that corresponds to each of the plurality of MRs and that is obtained by the feature vector module 120, a training set corresponding to each of the plurality of MRs, where any training set includes a feature vector and location information that correspond to one MR, and input, into a machine learning model for training, the training set corresponding to each of the plurality of MRs, to obtain the single-point positioning model.

Further, the emission probability calculation module 140 is further configured to input, into the single-point positioning model obtained by the regression processing module 130, the location information in each of the plurality of MRs obtained by the MR obtaining module 110 and the feature vector that corresponds to each of the plurality of MRs and that is obtained by the feature vector module 120, to obtain a mapping relationship, where the mapping relationship is used to indicate a correspondence between a feature vector and location information, and calculate, based on the mapping relationship, the emission probability of the feature vector corresponding to each of the plurality of MRs.

The apparatus for calculating an emission probability described in this embodiment is configured to implement the method described in the embodiment corresponding to FIG. 3. For more detailed descriptions, refer to the embodiment corresponding to FIG. 3. Details are not described herein again.

According to the apparatus for calculating an emission probability provided in this embodiment of this application, feature vectors obtained using a plurality of pieces of parameter information in MRs and engineering parameters of corresponding base stations are used as observed values, and then a single-point positioning model is trained using the feature vectors and location information that correspond to the MRs such that an emission probability obtained using a spatial model of the single-point positioning model can express complex observed information, and a correspondence between a feature vector (an observed value) and location information is more reliable.

Figure 13:
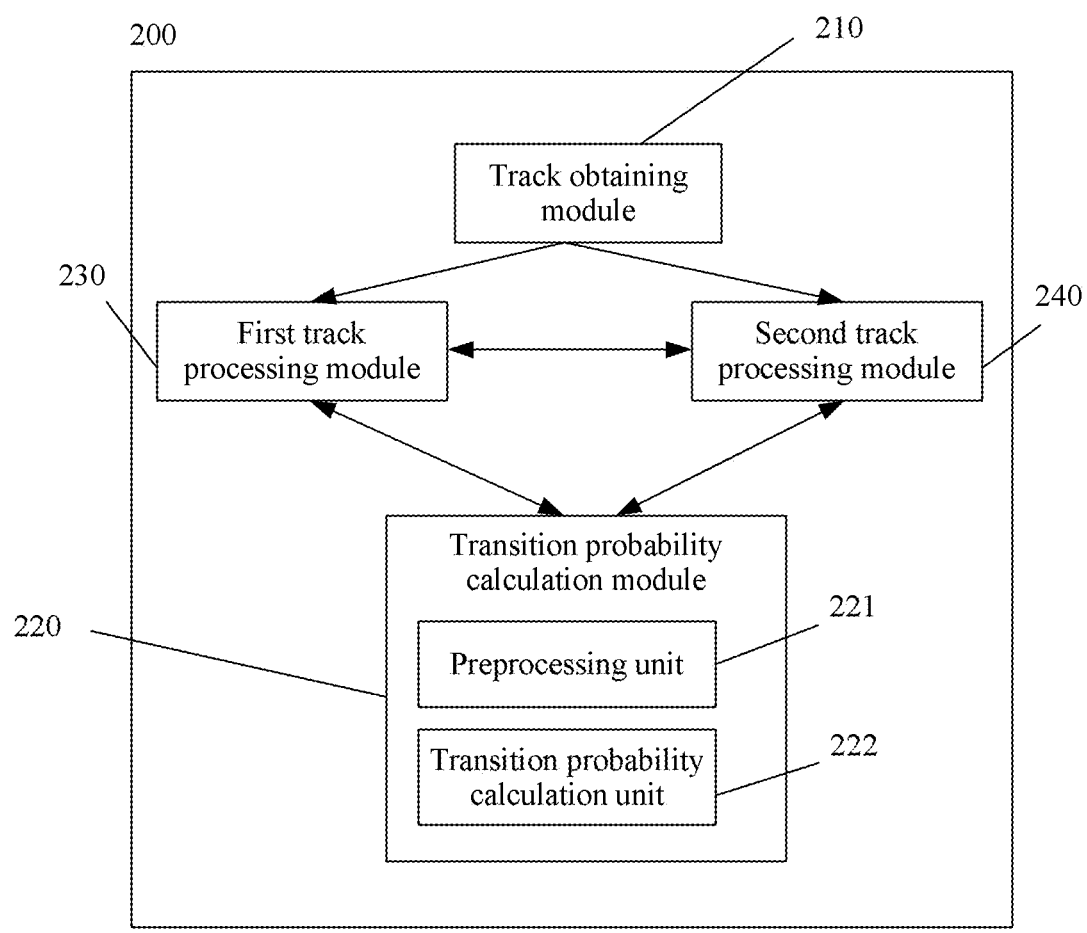
FIG. 13 is a schematic diagram of an apparatus for calculating a transition probability according to this application.

An embodiment of this application describes an apparatus for calculating a transition probability. As shown in FIG. 13, the apparatus 200 for calculating a transition probability includes a track obtaining module 210 and a transition probability calculation module 220. The track obtaining module 210 is configured to obtain a plurality of pieces of track data of a terminal in a target region, where the target region is a predetermined geographical region, each of the plurality of pieces of track data includes at least two pieces of location information, the location information is used to indicate a location of a corresponding terminal in the target region, and each of a plurality of pieces of location information included in the plurality of pieces of track data corresponds to a time stamp. The transition probability calculation module 220 is configured to calculate a transition probability based on the plurality of pieces of track data obtained by the track obtaining module 210, where the transition probability includes at least one transition probability value, and the transition probability value is used to indicate a probability that movement is performed from a piece of location information to another piece of location information after a time interval T. Optionally, the plurality of pieces of track data of the terminal in the target region in a peak traffic time period or a non-peak traffic time period are obtained.

Optionally, the plurality of pieces of track data each include an environment parameter indicating an environment in which a corresponding terminal moves to generate a corresponding track, for example, at least one of time period information, weather information, and event information. The track data can be classified based on the environment parameter. Track data including a same environment parameter is obtained from existing tracks including different environment parameters, for example, track data in a peak time period or track data during raining. Different transition probabilities can be obtained based on track data including different environment parameters, for example, an obtained transition probability corresponding to a raining environment is used to position a terminal in the target region during raining.

Further, the transition probability calculation module 220 includes a preprocessing unit 221 and a transition probability calculation unit 222. The preprocessing unit 221 is configured to process the plurality of pieces of track data obtained by the track obtaining module 210, to obtain at least one combination sequence of each of the plurality of pieces of track data, where the combination sequence includes any two pieces of location information in one piece of track data and a time interval between the any two pieces of location information. The transition probability calculation unit 222 is configured to obtain, based on a first preset condition and the at least one combination sequence that is of each of the plurality of pieces of track data and that is obtained by the preprocessing unit 221, a transition probability corresponding to the first preset condition, where the first preset condition is any one of a plurality of preset conditions, each of the plurality of preset conditions includes a preset time interval and preset location information, the preset time interval corresponds to the time interval T, and the preset location information corresponds to the piece of location information. Optionally, the preset time interval is a preset time interval range.

Further, the transition probability calculation unit 222 is further configured to determine combination sequences that include a preset time interval and preset location information in the first preset condition and that are in all combination sequences that are included in the plurality of pieces of track data and that are obtained by the preprocessing unit 221, and collect statistics about the combination sequences that include the preset time interval and the preset location information in the preset condition, and calculate the transition probability corresponding to the first preset condition.

Optionally, the apparatus 200 for calculating a transition probability further includes a first track processing module 230. The first track processing module 230 is configured to remove defective track data from the plurality of pieces of track data obtained by the track obtaining module 210, where the defective track data is track data in which at least one piece of location information deviates from a road in the target region by a distance greater than a first threshold, or is track data in which a distance between two pieces of adjacent location information is greater than a second threshold.

Optionally, the apparatus 200 for calculating a transition probability further includes a second track processing module 240. The second track processing module 240 is configured to determine sparse track data in the plurality of pieces of track data obtained by the track obtaining module 210, where the sparse track data is track data in which a distance between any two pieces of adjacent location information in the at least two pieces of location information included in the track data is greater than a third threshold, and insert one or more pieces of location information between the any two pieces of adjacent location information in the sparse track data based on map information of the target region.

The apparatus for calculating a transition probability described in this embodiment is configured to implement the method described in the embodiment corresponding to FIG. 5. For more detailed descriptions, refer to the embodiment corresponding to FIG. 5. Details are not described herein again.

According to the apparatus for calculating a transition probability provided in this embodiment of this application, a transition probability calculated based on movement track data that is of a terminal in a target region and that is provided by a third-party platform is used to recover or predict a movement track of a terminal in the target region such that the movement track is smoother, and track jumping can effectively be avoided.

Figure 14:
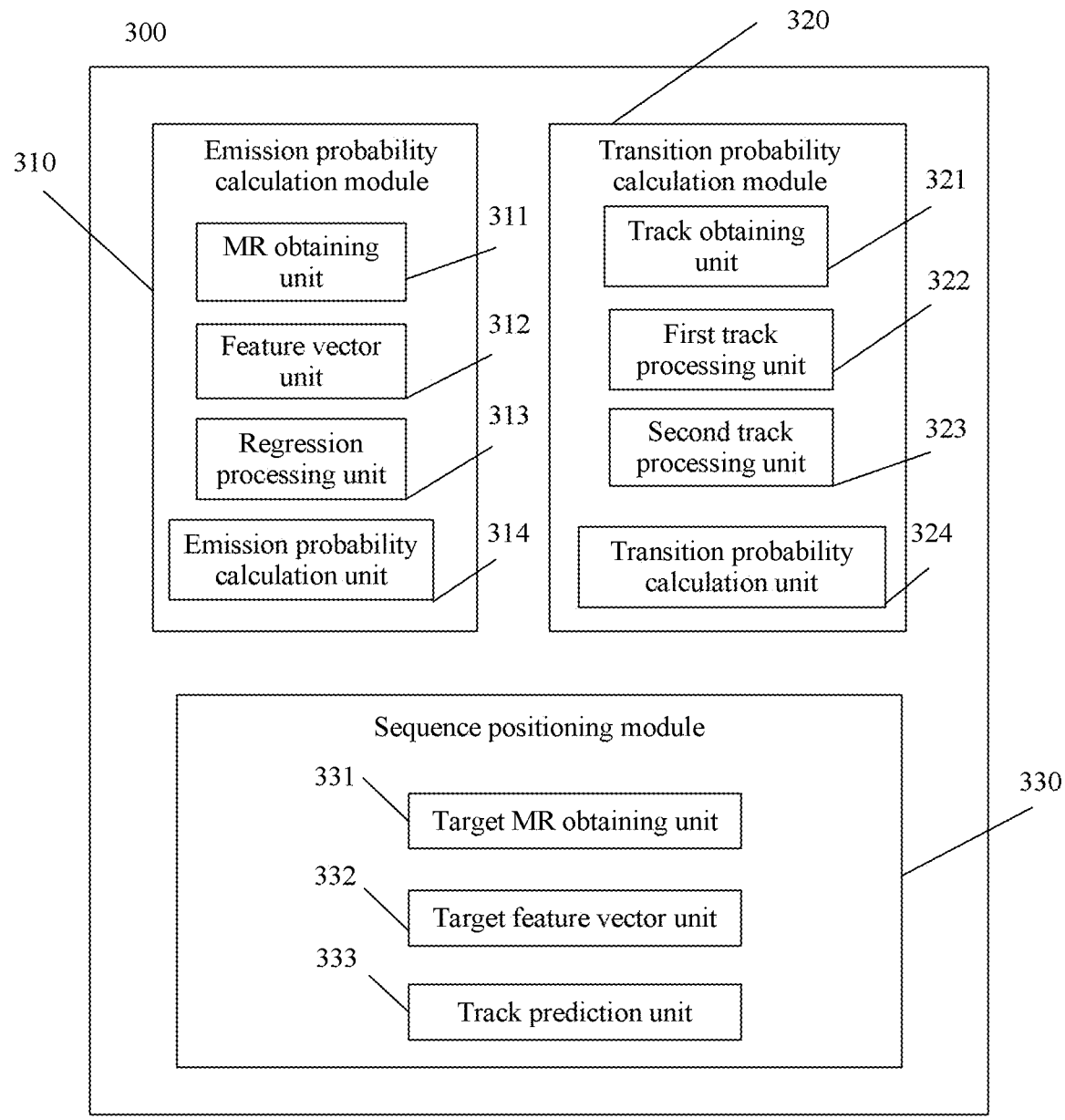
FIG. 14 is a schematic diagram of a sequence positioning apparatus according to this application.

An embodiment of this application provides a sequence positioning apparatus. As shown in FIG. 14, the sequence positioning apparatus 300 includes an emission probability calculation module 310, a transition probability calculation module 320, and a sequence positioning module 330. Application parameters of a sequence positioning model 330 include an emission probability and a transition probability. The emission probability calculation module 310 is configured to calculate the emission probability. The transition probability calculation module 320 is configured to calculate the transition probability. The sequence positioning module 330 is configured to obtain a movement track of a target terminal.

For example, the emission probability calculation module 310 includes a MR obtaining unit 311, a feature vector unit 312, a regression processing unit 313, and an emission probability calculation unit 314. The MR obtaining unit 311 is configured to obtain a plurality of MRs of a first terminal in a target region and an engineering parameter of at least one base station in the target region, where the target region is a predetermined geographical region, each of the plurality of MRs includes location information and parameter information, and the location information is used to indicate a location of a corresponding first terminal in the target region. The feature vector unit 312 is configured to obtain, based on the parameter information in each of the plurality of MRs and the engineering parameter of the at least one base station that are obtained by the MR obtaining unit 311, a feature vector corresponding to each of the plurality of MRs. The regression processing unit 313 is configured to obtain a single-point positioning model based on the location information in each of the plurality of MRs obtained by the MR obtaining unit 311 and the feature vector that corresponds to each of the plurality of MRs and that is obtained by the feature vector unit 312. The emission probability calculation unit 314 is configured to calculate, based on the single-point positioning model obtained by the regression processing unit 313, the parameter information in each of the plurality of MRs obtained by the MR obtaining unit 311, and the feature vector that corresponds to each of the plurality of MRs and that is obtained by the feature vector unit 312, an emission probability of the feature vector corresponding to each of the plurality of MRs, where the emission probability includes at least one emission probability value, and the emission probability value is used to indicate a probability that a feature vector corresponds to a piece of location information. The emission probability calculation module 310 described in this embodiment has same functions as the apparatus for calculating an emission probability described in the embodiment corresponding to FIG. 12. For detailed descriptions of the emission probability calculation module 310, refer to descriptions of the embodiment corresponding to FIG. 12. Details are not described herein again.

The transition probability calculation module 320 includes a track obtaining unit 321, a first track processing unit 322, a second track processing unit 323, and a transition probability calculation unit 324. The track obtaining unit 321 is configured to obtain a plurality of pieces of track data of a second terminal in the target region, where each of the plurality of pieces of track data includes at least two pieces of location information, the location information is used to indicate a location of a corresponding second terminal in the target region, and each of a plurality of pieces of location information included in the plurality of pieces of track data corresponds to a time stamp. The first track processing unit 322 is configured to remove defective track data from the plurality of pieces of track data obtained by the track obtaining unit 321, where the defective track data is track data in which at least one piece of location information deviates from a road in the target region by a distance greater than a first threshold, or is track data in which a distance between two pieces of adjacent location information is greater than a second threshold. The second track processing module 323 is configured to determine sparse track data in the plurality of pieces of track data obtained by the track obtaining unit 321, where the sparse track data is track data in which a distance between any two pieces of adjacent location information in the at least two pieces of location information included in the track data is greater than a third threshold, and insert one or more pieces of location information between the any two pieces of adjacent location information in the sparse track data based on map information of the target region. The transition probability calculation unit 324 is configured to calculate a transition probability based on the plurality of pieces of track data processed by the first track processing unit 322 and/or the second track processing unit 323, where the transition probability includes at least one transition probability value, and the transition probability value is used to indicate a probability that movement is performed from a piece of location information to another piece of location information after a time interval T. Optionally, the plurality of pieces of track data obtained by the track obtaining unit 321 are not processed by the first track processing unit 322 and the second track processing unit 323, and the transition probability calculation unit 324 calculates a transition probability based on the plurality of pieces of track data obtained by the track obtaining unit 321. The transition probability calculation module 320 described in this embodiment has same functions as the apparatus for calculating a transition probability described in the embodiment corresponding to FIG. 13. For detailed descriptions of the transition probability calculation module 320, refer to descriptions of the embodiment corresponding to FIG. 13. Details are not described herein again.

The sequence positioning module 330 includes a target MR obtaining unit 331, a target feature vector unit 332, and a track prediction unit 333. The target MR unit 331 is configured to obtain a plurality of target MRs of a target terminal in the target region and the engineering parameter of the at least one base station in the target region, where the target region is a predetermined geographical region, and each of the plurality of target MRs includes parameter information. The target feature vector unit 332 is configured to obtain, based on the parameter information in each of the plurality of target MRs and the engineering parameter of the at least one base station that are obtained by the target MR unit 331, a target feature vector corresponding to each of the plurality of target MRs. The track prediction unit 333 is configured to obtain a movement track of the target terminal based on the target feature vector that corresponds to each of the plurality of target MRs and that is obtained by the target feature vector unit 332. According to the sequence positioning apparatus provided in this embodiment of this application, an emission probability obtained based on feature vectors obtained based on a plurality of pieces of parameter information in MRs and engineering parameters of corresponding base stations can express more complex observed information, thereby further improving accuracy and reliability of a movement track recovered/predicted through sequence positioning. Alternatively, a transition probability obtained using real track data from a third party is used for sequence positioning such that smoothness of a recovered/ predicted movement track can be improved, and the obtained movement track is more reliable.

Figure 15:
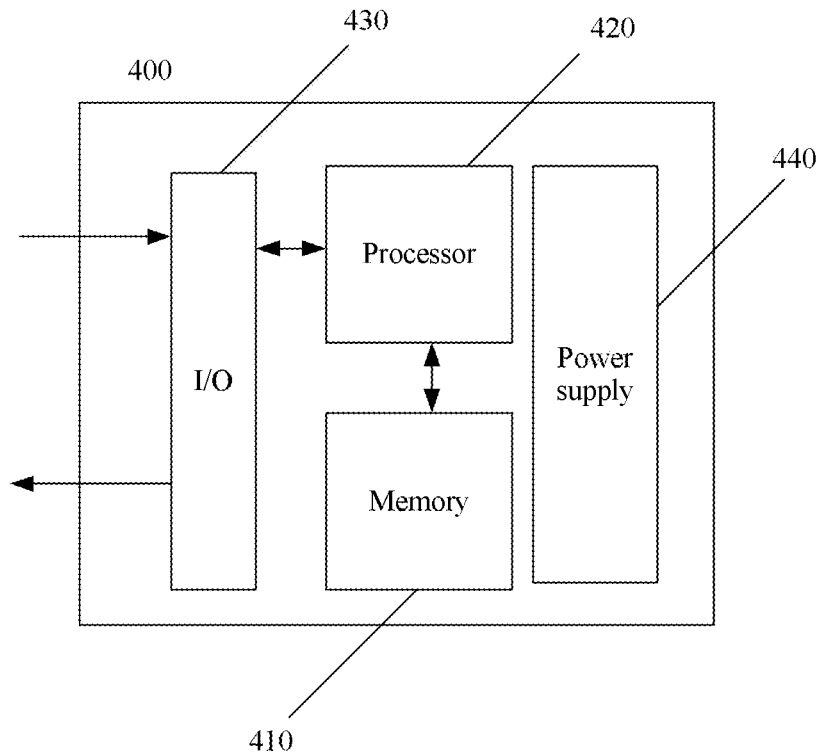
FIG. 15 is a schematic diagram of a device for calculating an emission probability and/or a transition probability according to this application.

An embodiment of this application provides a device. As shown in FIG. 15, the device 400 includes a memory 410, a processor 420, an input/output port 430, and a power supply 440.

The memory 410 is configured to store a programmable instruction.

The processor 420 may invoke the programmable instruction stored in the memory 410, to perform the method for obtaining an emission probability described in the embodiment corresponding to FIG. 3 and/or the method for obtaining a transition probability described in the embodiment corresponding to FIG. 5. For a method, refer to descriptions of a corresponding embodiment. Details are not described herein again.

The input/output port 430 is used by the processor 420 to exchange data with a device or an apparatus outside the device 400. For example, the processor 420 obtains MR and/or track data from the outside using the input/output port 430, and outputs a calculation result using the input/output port 430.

The power supply 440 is configured to supply required power for the device 400.

Figure 16:
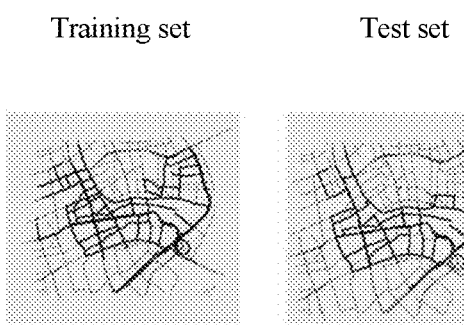
FIG. 16 is an experiment setting and a result of an actual testing experiment according to this application.

FIG. 16 shows an experiment setting and a result of an actual testing experiment according to a solution of this application. Compared with a current mainstream single-point positioning method in the industry such as fingerprint positioning, range-based positioning, and other sequence positioning, in the sequence positioning method based on machine learning and feature engineering described in the embodiments of this application, precision is greatly improved. In the sequence positioning method described in the embodiments of this application, a median of errors obtained using drive test data may reach 22 meters, and precision is improved by more than 20%.

Compared with a case in which only single signal strength is considered in a definition of an observed value in other approaches, in the present disclosures, the definition is extended to a combination of features in any dimension.

In other approaches, there are mainly two manners of calculating a transition probability. One manner is to directly perform transition from a current grid to a neighboring grid based on an equal probability. The other manner is to assume an equation of a motion pattern, to calculate the transition probability according to the equation. According to the method described in the embodiments of this application, a transition probability at each time granularity is calculated using real data. This is more realistic than other approaches and the probability is at a finer granularity.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method, comprising:
   obtaining pieces of track data of terminals in a target region from a third-party platform, wherein the target region is a predetermined geographical region, wherein the pieces of track data comprise a same environment parameter, wherein the same environment parameter indicates an environment in which a first terminal in the terminals corresponding to track data comprising the same environment parameter is located, wherein each of the pieces of track data comprises at least two pieces of location information, wherein the at least two pieces of location information indicate a first location that is in the target region and that is of a second terminal in the terminals corresponding to track data comprising first location information, and wherein each piece of location information in the at least two pieces of location information corresponds to a time stamp; and
   calculating a transition probability based on the pieces of track data,
   wherein the transition probability comprises at least one transition probability value, and
   wherein the at least one transition probability value indicates a probability that movement from a first piece of location information to a second piece of location information occurs after a time interval T.

2. The method of claim 1, wherein calculating the transition probability comprises:
   processing the pieces of track data to obtain at least one combination sequence of each of the pieces of track data, wherein the at least one combination sequence comprises any two pieces of location information in one piece of track data and a first time interval between the any two pieces of location information; and
   obtaining, based on a first preset condition and the at least one combination sequence, a first transition probability corresponding to the first preset condition, wherein the first preset condition is any one of a plurality of preset conditions, wherein each preset condition in the plurality of preset conditions comprises a preset time interval and preset location information, wherein the preset time interval corresponds to the time interval T, and wherein the preset location information corresponds to a piece of location information.

3. The method of claim 2, wherein obtaining the first transition probability corresponding to the first preset condition comprises:
   obtaining first combination sequences that comprise the preset time interval and the preset location information in the first preset condition and that are in all combination sequences in the pieces of track data;
   collecting statistics about the first combination sequences; and
   calculating the first transition probability corresponding to the first preset condition.

4. The method of claim 1, wherein before calculating the transition probability, the method further comprises removing defective track data from the pieces of track data, and wherein the defective track data is one of first track data in which at least one piece of location information deviates from a road in the target region by a first distance greater than a first threshold or second track data in which a second distance between two pieces of adjacent location information is greater than a second threshold.

5. The method of claim 1, wherein before calculating the transition probability, the method further comprises:
   obtaining sparse track data in the pieces of track data, wherein the sparse track data is track data in which a distance between any two pieces of adjacent location information is greater than a third threshold; and inserting one or more pieces of location information between the any two pieces of adjacent location information in the sparse track data based on map information of the target region.

6. The method of claim 1, wherein obtaining the pieces of track data comprises obtaining the pieces of track data in a peak traffic time period or a non-peak traffic time period.

7. The method of claim 1, wherein the environment parameter comprises at least one of time period information, weather information, or event information.

8. The method of claim 2, wherein the preset time interval is a preset time interval range.

9. An apparatus, comprising:
a memory configured to store a programmable instruction; and
a processor coupled to the memory and configured to execute the programmable instruction to:
obtain pieces of track data of terminals in a target region from a third-party platform, wherein the target region is a predetermined geographical region, wherein the pieces of track data comprise a same environment parameter, wherein the same environment parameter indicates an environment in which a first terminal in the terminals corresponding to track data comprising the same environment parameter is located, wherein each of the pieces of track data comprises at least two pieces of location information, wherein the at least two pieces of location information indicate a first location that is in the target region and that is of a second terminal in the terminals corresponding to track data comprising first location information, and wherein each piece of location information in the at least two pieces of location information corresponds to a time stamp; and
calculate a transition probability based on the pieces of track data,
wherein the transition probability comprises at least one transition probability value, and
wherein the at least one transition probability value indicates a probability that movement from a first piece of location information to a second piece of location information occurs after a time interval T.

10. The apparatus of claim 9, wherein the processor is configured to execute the programmable instruction to calculate the transition probability by:
processing the pieces of track data to obtain at least one combination sequence of each of the pieces of track data, wherein the at least one combination sequence comprises any two pieces of location information in one piece of track data and a first time interval between the any two pieces of location information; and
obtaining, based on a first preset condition and the at least one combination sequence, a first transition probability corresponding to the first preset condition.

11. The apparatus of claim 10, wherein the first preset condition is any one of a plurality of preset conditions, and wherein each preset condition in the plurality of preset conditions comprises a preset time interval and preset location information.

12. The apparatus of claim 11, wherein the preset time interval corresponds to the time interval T, and wherein the preset location information corresponds to a piece of location information.

13. The apparatus of claim 12, wherein the processor is configured to execute the programmable instruction to obtain the transition probability corresponding to the first preset condition by:
obtaining first combination sequences that comprise the preset time interval and the preset location information in the first preset condition and that are in all combination sequences in the pieces of track data;
collecting statistics about the first combination sequences; and
calculating the transition probability corresponding to the first preset condition.

14. The apparatus of claim 9, wherein before calculating the transition probability, the processor is configured to execute the programmable instruction to remove defective track data from the pieces of track data, and wherein the defective track data is one of first track data in which at least one piece of location information deviates from a road in the target region by a first distance greater than a first threshold, or second track data in which a second distance between two pieces of adjacent location information is greater than a second threshold.

15. The apparatus of claim 9, wherein before calculating the transition probability, the processor is configured to execute the programmable instruction to:
obtain sparse track data in the pieces of track data, wherein the sparse track data is track data in which a distance between any two pieces of adjacent location information is greater than a third threshold; and
insert one or more pieces of location information between the any two pieces of adjacent location information in the sparse track data based on map information of the target region.

16. The apparatus of claim 9, wherein the processor is configured to obtain the pieces of track data during a peak traffic time period.

17. The apparatus of claim 9, wherein the processor is configured to obtain the pieces of track data during a non-peak traffic time period.

18. The apparatus of claim 9, wherein the same environment parameter comprises time period information.

19. The apparatus of claim 9, wherein the same environment parameter comprises weather information or event information.

20. A non-transitory computer medium configured to store instructions, which when executed by a processor of an apparatus, cause the apparatus to:
obtain pieces of track data of terminals in a target region from a third-party platform, wherein the target region is a predetermined geographical region, wherein the pieces of track data comprise a same environment parameter, wherein the same environment parameter indicates an environment in which a first terminal in the terminals corresponding to track data comprising the same environment parameter is located, wherein each of the pieces of track data comprises at least two pieces of location information, wherein the at least two pieces of location information indicate a first location that is in the target region and that is of a second terminal in the terminals corresponding to track data comprising first location information, and wherein each piece of location information in the at least two pieces of location information corresponds to a time stamp; and
calculate a transition probability based on the pieces of track data,
wherein the transition probability comprises at least one transition probability value, and wherein the at least one transition probability value indicates a probability that movement from a first piece of location information to a second piece of location information occurs after a time interval T.

\* \* \* \* \*